US012474665B2

(12) United States Patent
Terakawa

(10) Patent No.: US 12,474,665 B2
(45) Date of Patent: Nov. 18, 2025

(54) IMAGE FORMING APPARATUS HAVING FIRST AND SECOND INNER COVER WITH DUCT ARRANGEMENT

(71) Applicant: CANON KABUSHIKI KAISHA, Tokyo (JP)

(72) Inventor: Shogo Terakawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/795,435

(22) Filed: Aug. 6, 2024

(65) Prior Publication Data

US 2024/0393734 A1 Nov. 28, 2024

Related U.S. Application Data

(63) Continuation of application No. 18/187,979, filed on Mar. 22, 2023, now Pat. No. 12,085,883.

(30) Foreign Application Priority Data

Mar. 28, 2022 (JP) ................................ 2022-051433

(51) Int. Cl.
*G03G 21/00* (2006.01)
*G03G 21/16* (2006.01)
*G03G 21/20* (2006.01)

(52) U.S. Cl.
CPC ....... *G03G 21/1633* (2013.01); *G03G 21/206* (2013.01); *G03G 2221/1645* (2013.01); *G03G 2221/169* (2013.01)

(58) Field of Classification Search
CPC ............. G03G 21/1633; G03G 21/206; G03G 21/185; G03G 2221/1645; G03G 2221/169
USPC .................................................. 399/92, 111
See application file for complete search history.

(56) References Cited

U.S. PATENT DOCUMENTS

| | | | |
|---|---|---|---|
| 2007/0104509 | A1 | 5/2007 | Kabashima |
| 2009/0123173 | A1 | 5/2009 | Kadowaki |
| 2011/0116826 | A1 | 5/2011 | Nishikawa |
| 2011/0206408 | A1 | 8/2011 | Brown et al. |
| 2011/0280609 | A1 | 11/2011 | Nakazawa et al. |
| 2012/0230720 | A1 | 9/2012 | Murano |

(Continued)

FOREIGN PATENT DOCUMENTS

| | | |
|---|---|---|
| JP | 2021047344 A | 3/2021 |

OTHER PUBLICATIONS

Notice of Allowance issued in U.S. Appl. No. 18/187,979 mailed May 15, 2024.

*Primary Examiner* — Robert B Beatty
(74) *Attorney, Agent, or Firm* — ROSSI, KIMMS & McDOWELL LLP

(57) ABSTRACT

An image forming apparatus includes a casing, an image forming unit, an outer cover, a first inner cover arranged to face an inner side of the outer cover in a closed state, the first inner cover being made of resin, a second inner cover arranged to face the inner side of the outer cover in the closed state, the second inner cover being made of resin, a first fan, and a second fan. The first inner cover includes a first duct configured to guide air taken in from an exterior of the image forming apparatus by rotation of the first fan to the image forming unit. The second inner cover includes a second duct configured to guide air taken in from the exterior of the image forming apparatus by rotation of the second fan to the image forming unit.

37 Claims, 10 Drawing Sheets

(56) References Cited

U.S. PATENT DOCUMENTS

| | | | |
|---|---|---|---|
| 2013/0142538 A1 | 6/2013 | Miwa et al. | |
| 2014/0205309 A1 | 7/2014 | Kawasumi | |
| 2015/0084277 A1* | 3/2015 | Maruyama ............. | B65H 5/062 271/272 |
| 2016/0004215 A1 | 1/2016 | Yamashita et al. | |
| 2018/0052419 A1* | 2/2018 | Maeda ............... | G03G 21/1842 |
| 2022/0365480 A1 | 11/2022 | Kawasumi | |
| 2022/0404763 A1 | 12/2022 | Tashiro | |
| 2023/0305483 A1 | 9/2023 | Takayama et al. | |

* cited by examiner

FIG.8A RELEASED STATE, TOP VIEW
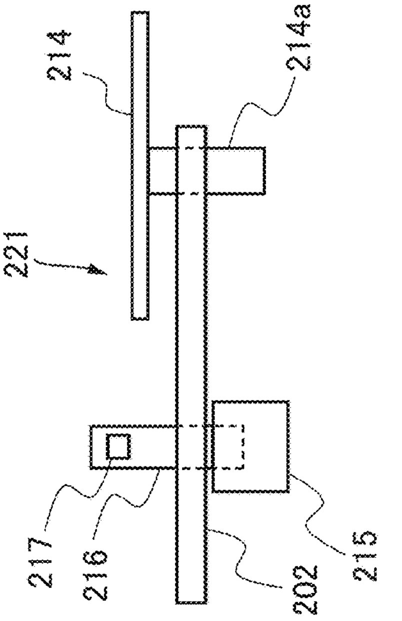
FIG.8B RELEASED STATE, FRONT VIEW
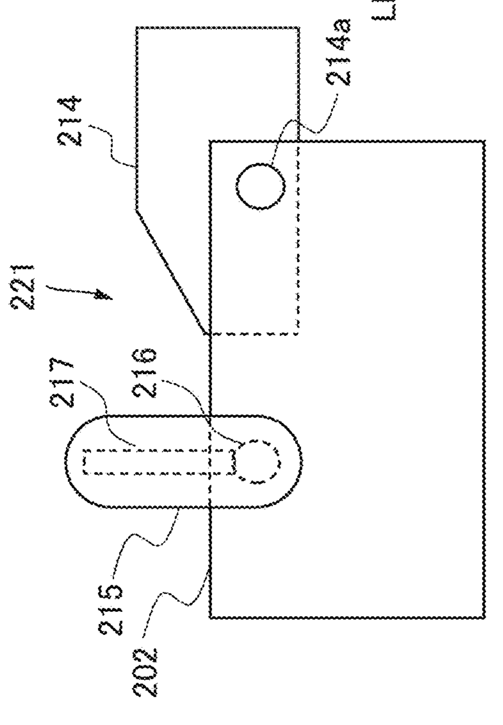
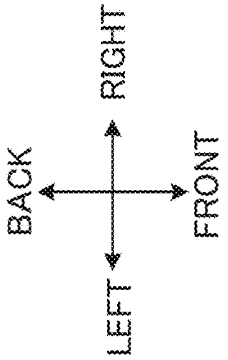
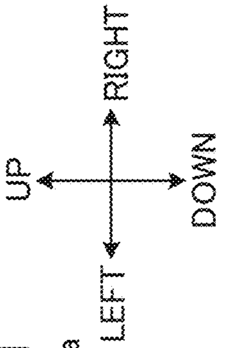
FIG.8C LOCKED STATE, TOP VIEW
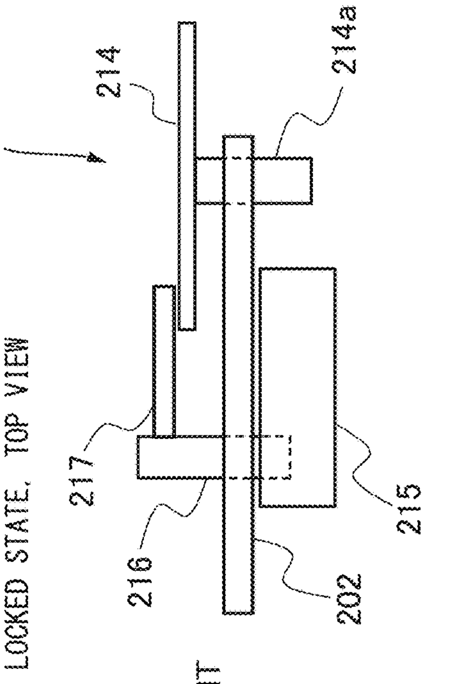
FIG.8D LOCKED STATE, FRONT VIEW
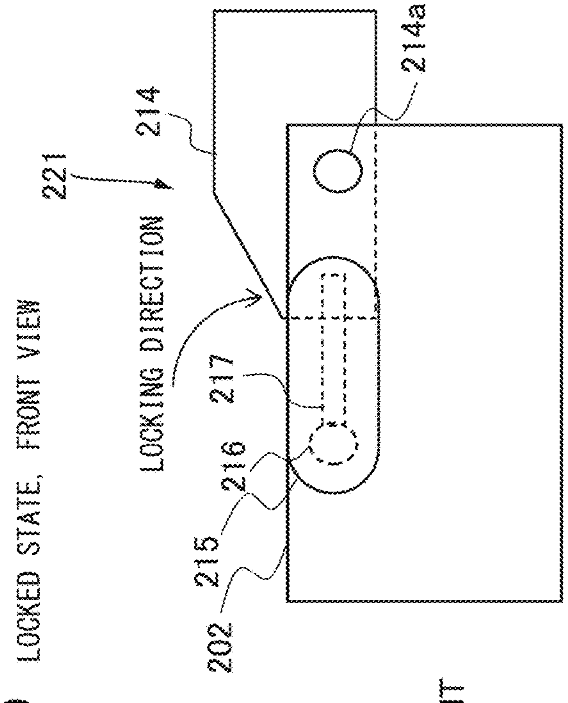

IMAGE FORMING APPARATUS HAVING FIRST AND SECOND INNER COVER WITH DUCT ARRANGEMENT

BACKGROUND OF THE INVENTION

Field of the Invention

The present invention relates to image forming apparatuses, such as a printer, a copying machine, a facsimile, or a multifunction apparatus.

Description of the Related Art

Japanese Patent Application Laid-Open Publication No. 2021-47344 proposes an image forming apparatus equipped with an exterior cover disposed in an openable and closable manner on a casing, and a separately disposed inner cover arranged on an inner side of the exterior cover in a closed state. An image forming unit including a photosensitive drum, a charging unit, and a developing unit is arranged on an inner side of the inner cover. The inner cover is provided to prevent users from erroneously touching a power supply unit or a movable unit of the image forming unit when the users open the exterior cover, for example, to remove a recording material that has been jammed in midway of a conveyance path and not discharged from the apparatus.

Further, the image forming apparatus may be equipped with a fan for taking in air from an exterior, and a large number of ducts for guiding the air taken in from the exterior by the fan toward the image forming unit including the charging units and the developing units. Air is sent toward the image forming unit so as to collect discharge products such as ozone that has been generated by charging the charging unit and to suppress rising of temperature of the developing unit accompanying a toner agitating operation within the developing unit.

Image forming apparatuses for carrying out commercial printing in which toner images are formed on a large number of recording materials in a short time are being used. In such apparatuses, since there is a large amount of discharge products generated from the charging unit and the temperature of the developing unit tends to rise, a large-scale fan capable of taking in a large amount of air is used. However, even the image forming apparatus for commercial printing is required to be downsized, such that there is not enough space for installing a large-scale fan in the vicinity of the charging unit or the developing unit within the casing, and the large-scale fan is arranged at a position distant from the charging unit or the developing unit and a long duct must be disposed. Since the duct is extended, a cross-sectional area of the flow path of the duct must be increased to reduce pressure loss in the duct. Therefore, it may be possible to form a duct on the inner cover made of resin that has a relatively wide space. The inner cover is manufactured by a machining device that performs injection molding using resin.

However, the image forming apparatuses for commercial printing include a plurality of image forming units for forming toner images on a recording material arranged in parallel, such that the inner cover is elongated in a longitudinal direction, i.e., direction along which the image forming units are arranged, and warping tends to occur to the inner cover in proportion to its size. If warping of the inner cover occurs, it becomes difficult to attach the inner cover to the casing, and even if the inner cover can be attached to the casing, the duct may not be arranged at the correct position.

SUMMARY OF THE INVENTION

According to one aspect of the present invention, an image forming apparatus includes a casing, an image forming unit disposed in the casing and configured to form a toner image on a recording material, an outer cover disposed on the casing and configured to be opened and closed with respect to the casing, a first fan; a second fan; a first inner cover arranged to face an inner side of the outer cover in a closed state, the first inner cover being made of resin, the first inner cover including a first duct configured to guide air taken in from an exterior of the image forming apparatus by rotation of the first fan to the image forming unit, and a second inner cover arranged to face the inner side of the outer cover in the closed state, the second inner cover being made of resin, the second inner cover including a second duct configured to guide air taken in from the exterior of the image forming apparatus by rotation of the second fan to the image forming unit.

Further features of the present invention will become apparent from the following description of exemplary embodiments with reference to the attached drawings.

BRIEF DESCRIPTION OF THE DRAWINGS

FIG. 8A is a top view illustrating the released state by a fixing portion.

FIG. 8B is a front view illustrating a released state by the fixing portion.

FIG. 8C is a top view illustrating a fixed state by the fixing portion.

FIG. 8D is a front view illustrating the fixed state by the fixing portion.

DESCRIPTION OF THE EMBODIMENTS

First Embodiment

Image Forming System

Figure 1:
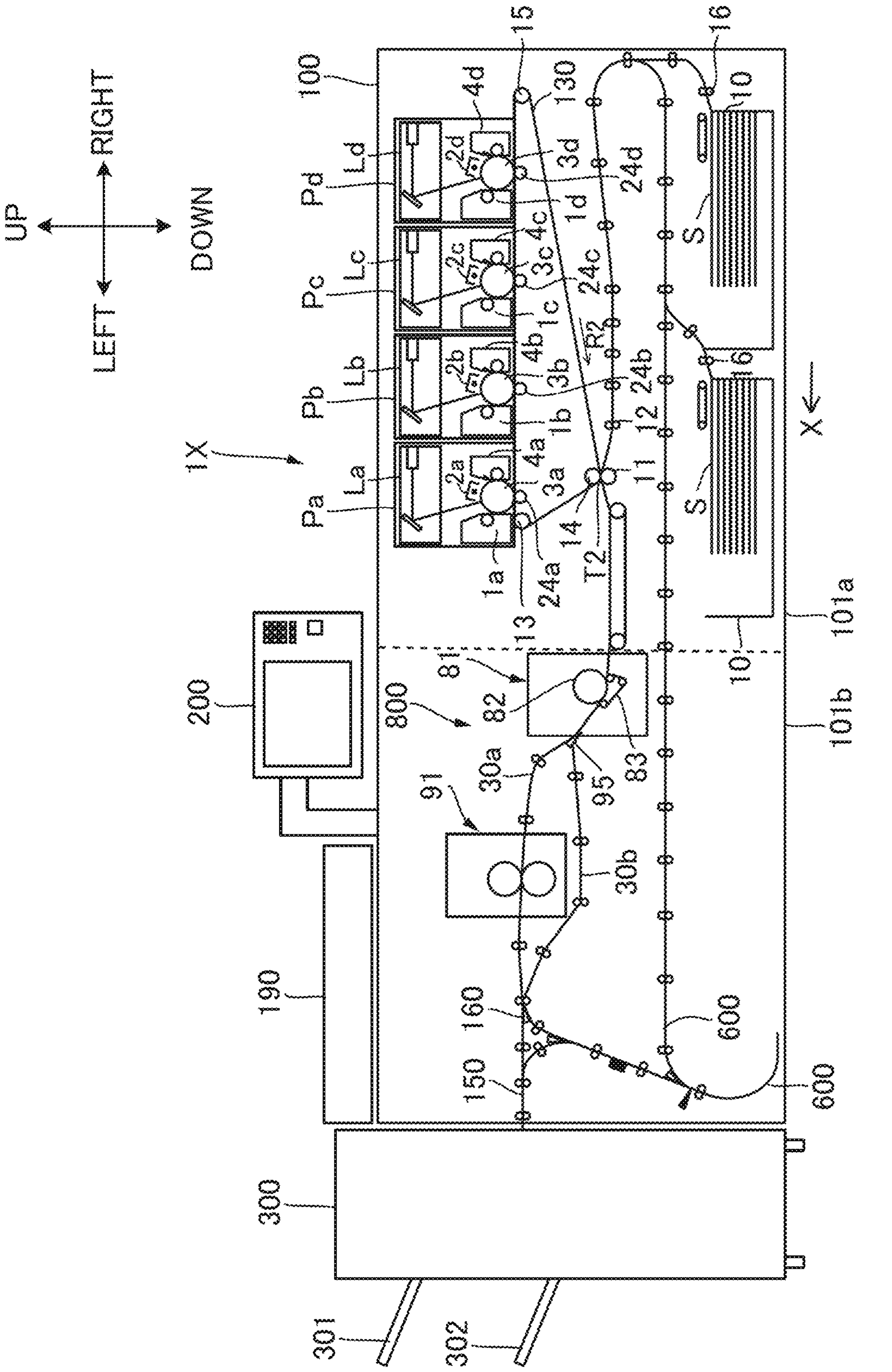
FIG. 1 is a schematic drawing illustrating an image forming system equipped with an image forming apparatus according to the present embodiment.

A general configuration of an image forming system equipped with an image forming apparatus according to a present embodiment will be described with reference to FIG. 1. An image forming system 1X illustrated in FIG. 1 includes an image forming apparatus 100, and a finisher apparatus 300. The image forming apparatus 100 and the finisher apparatus 300 are connected in a manner capable of conveying a recording material S therebetween. In the present embodiment, the finisher apparatus 300 is a post-processing unit retrofittable to the image forming apparatus 100 for expansion of functions, and offers postprocessing described below to the recording material S to which a toner image has been fixed by the image forming apparatus 100. The image forming apparatus 100 and the finisher apparatus 300 are connected in a manner capable of communicating data signals via a communication interface capable of realizing serial and parallel communications.

Image Forming Apparatus

The image forming apparatus 100 is a tandem full-color printer adopting an electrophotographic system, and includes a first casing 101*a* and a second casing 101*b*. The first casing 101*a* includes various devices and members for realizing steps related to conveying the recording material S and transferring toner images thereto. Meanwhile, the second casing 101*b* includes various devices and members, such as a fixing unit 800, for realizing steps related to conveying the recording material S and fixing toner images thereto. Moreover, the second casing 101*b* is provided with an operation portion 200 arranged on a front side thereof that includes a display portion capable of displaying various information and keys allowing users to enter various information. The second casing 101*b* is arranged on a first end side of the first casing 101*a* in a right-left direction of the image forming apparatus 100, that is, direction along which image forming portions Pa to Pd are arranged, i.e., longitudinal direction, and the first casing 101*a* and the second casing 101*b* are connected in a manner capable of conveying the recording material S therebetween.

In the present specification, a side on which the user stands when operating the operation portion 200 is referred to as a "front side", or front, and an opposite side thereof is referred to as a "rear side", or back. A left side viewed from the front side is referred to as "left", and a right side viewed from the front side is referred to as "right". FIG. 1 illustrates the image forming system 1X viewed from the front side.

The image forming apparatus 100 is equipped with four image forming portions Pa, Pb, Pc, and Pd for forming yellow, magenta, cyan, and black images, respectively. The image forming apparatus 100 forms a toner image on the recording material S based on image signals from a document reading apparatus 190 for reading image signals from documents or from an external apparatus such as a personal computer not shown. Paper, such as normal paper, thick paper, rough paper, uneven paper, and coated paper, plastic films, and cloth can be used as the recording material S.

As illustrated in FIG. 1, the image forming portions Pa to Pd respectively serving as image forming units are aligned along an intermediate transfer belt 130. The intermediate transfer belt 130 is stretched across a plurality of rollers 13, 14, and 15, and moved in the direction of arrow R2. The intermediate transfer belt 130 bears and conveys the toner image being primarily transferred thereto as described below. A secondary transfer outer roller 11 is arranged at a position opposing a secondary transfer inner roller 14, across which the intermediate transfer belt 130 is stretched, with the intermediate transfer belt 130 interposed therebetween, forming a secondary transfer portion T2 for transferring the toner image on the intermediate transfer belt 130 to the recording material S. The fixing unit 800 is arranged downstream in a recording material conveyance direction of the secondary transfer portion T2, i.e., arrow X direction.

A plurality of (two according to the present example) cassettes 10 storing the recording material S are arranged at a lower part of the image forming apparatus 100. Recording materials S having different sizes and thicknesses are stored in the cassettes 10, and the recording material S is selectively conveyed from one of the cassettes 10. The recording material S is conveyed by a conveyance roller 16 from the cassette 10 through a conveyance path to a registration roller 12. Thereafter, the registration roller 12 rotates in synchronization with the toner image formed on the intermediate transfer belt 130, by which the recording material S is conveyed toward the secondary transfer portion T2. The recording material S placed on a manual sheet feed portion not shown can also be conveyed instead of the recording material S stored in the cassettes 10.

The image forming portions Pa, Pb, Pc, and Pd adopt an approximately identical configuration except for the different developer colors for the toner image. Therefore, the image forming portion Pa for developing a yellow image will be described as a representative example, and descriptions of other image forming portions Pb, Pc, and Pd are omitted.

A photosensitive drum 3*a* serving as a photosensitive member is arranged in the image forming portion Pa. The photosensitive drum 3*a* is driven to rotate by a motor not shown. A charging unit 2*a*, an exposing unit La, a developing unit 1*a*, a primary transfer roller 24*a*, and a drum cleaning device 4*a* are arranged in a circumference of the photosensitive drum 3*a*.

A process for forming a full-color image by the image forming apparatus 100 will be described. At first, when the image forming operation is started, the surface of the photosensitive drum 3*a* being rotated is charged uniformly by the charging unit 2*a*. The charging unit 2*a* can be a corona charger, for example, that irradiates charged particles through corona discharge to charge the surface of the photosensitive drum 3*a* to uniform potential. Next, the photosensitive drum 3*a* is scanned and exposed by laser light corresponding to an image signal generated from the exposing unit La. Thereby, an electrostatic latent image corresponding to the image signal is formed on the surface of the photosensitive drum 3*a*. The electrostatic latent image formed on the photosensitive drum 3*a* is developed into a toner image, which is a visible image, by developer containing toner and carrier stored in the developing unit 1*a*. In other words, the toner image is developed by having toner supplied to the photosensitive drum 3*a* from the developing unit 1*a*. Developer is conveyed in circulation while being agitated by a conveyance screw not shown within the developing units 1*a* to 1*d*.

The toner image formed on the photosensitive drum 3*a* is primarily transferred to the intermediate transfer belt 130 at a primary transfer portion formed between the photosensitive drum 3*a* and the primary transfer roller 24*a* opposed thereto with the intermediate transfer belt 130 interposed therebetween. In this state, primary transfer voltage is applied to the primary transfer roller 24*a*. Toner remaining on the surface of the photosensitive drum 3*a* after primary transfer is removed by the drum cleaning device 4*a*.

Such an operation is performed sequentially for each of the image forming portions Pa to Pd for yellow, magenta, cyan, and black image, and the toner images of four colors are superposed on the intermediate transfer belt 130. Thereafter, at a matched timing with the forming of toner image, the recording material S stored in the cassette 10 is conveyed to the secondary transfer portion T2. Then, by applying a secondary transfer voltage to the secondary transfer outer roller 11, a full-color toner image formed on the intermediate transfer belt 130 is secondarily transferred collectively to the recording material S. Toner remaining on the intermediate transfer belt 130 after secondary transfer is removed by a belt cleaning device not shown.

The recording material S to which the toner image has been transferred is conveyed to the fixing unit 800. The fixing unit 800 fixes the toner image to the recording material S by applying heat and pressure to the recording material S to which the toner image has been transferred. In the present embodiment, after applying heat and pressure to the recording material S by a first fixing device 81, additional heat and pressure can be selectively applied by a second fixing device 91. The fixing unit 800 can switch paths between a path for conveying the recording material S toward the second fixing device 91 after passing through the first fixing device 81 and a path for conveying the recording material S in a route avoiding the second fixing device 91 after passing through the first fixing device 81 by a switching flapper 95.

The second fixing device 91 is arranged downstream of the first fixing device 81 in the conveyance direction of the recording material S. The second fixing device 91 is used selectively with the aim of additionally applying glossiness, for example, to the toner image on the recording material S having been fixed by the first fixing device 81. For example, in a case where the recording material S is coated paper such as glossy paper or synthetic paper, the recording material S having passed through the first fixing device 81 is conveyed through a fixing route 30*a* such that fixing is performed by both the first fixing device 81 and the second fixing device 91. In contrast, if the recording material S is noncoated paper such as normal paper, the recording material S having passed through the first fixing device 81 is conveyed through a bypath route 30*b* that avoids the second fixing device 91 so that fixing is only performed by the first fixing device 81 and fixing is not performed by the second fixing device 91.

The first fixing device 81 and the second fixing device 91 described above can adopt the same configuration, so the first fixing device 81 is described here as an example. The first fixing device 81 includes a fixing roller 82, or fixing belt, that is rotatable in contact with a surface of the recording material S on which the toner image has been fixed, and a pressing belt 83, or pressure roller, that forms a fixing nip portion by being in pressure contact with the fixing roller 82. At least one of the fixing roller 82 and the pressing belt 83 is heated by a heater not shown. The first fixing device 81 applies heat and pressure to the recording material S when nipping and conveying the recording material S to which the toner image has been formed in the fixing nip portion formed by the fixing roller 82 and the pressing belt 83, and the toner image is fixed to the recording material S.

According to the present embodiment, the image forming apparatus 100 is capable of performing duplex printing. In the case of a single-side printing, the recording material S to which the toner image has been fixed is conveyed to a sheet discharge conveyance path 150 and discharged to the exterior of the image forming apparatus 100. In the case of a duplex printing, the recording material S to which the toner image has been fixed is conveyed to a reverse conveyance path 600. The reverse conveyance path 600 is formed across the first casing 101*a* and the second casing 101*b*. In the reverse conveyance path 600, the recording material S is reversed by a switch-back operation, and the front and back sides of the recording material S are switched. The recording material S that has been reversed is conveyed toward the registration roller 12, and is conveyed by the registration roller 12 to the secondary transfer portion T2 in a state where the back side on which printing has not been performed is faced toward the intermediate transfer belt 130. In the secondary transfer portion T2, the full-color toner image formed on the intermediate transfer belt 130 is secondarily transferred collectively to the back side of the recording material S. Thereafter, fixing of toner image by the fixing unit 800 is performed to the recording material S, and the recording material S is discharged to the exterior of the image forming apparatus 100 in a state where the side on which image has been formed immediately prior thereto, i.e., image forming surface, is facing upward. The switching of the sheet discharge conveyance path 150 and the reverse conveyance path 600 described above is performed by a switching flapper 160.

The finisher apparatus 300 is connected to the image forming apparatus 100 in a manner capable of having the recording material S conveyed thereto, and the recording material S discharged from the image forming apparatus 100 is conveyed to the finisher apparatus 300. The recording material S conveyed to the finisher apparatus 300 is subjected to post-processing, such as a punching process in which holes are punched to the recording material S or a stapling process in which a plurality of recording materials S are bundled and stapled, in the finisher apparatus 300. In the finisher apparatus 300, the recording material S having holes punched thereto is discharged to an upper sheet discharge tray 301, and the bundle of recording materials S being stapled together is discharged to a lower sheet discharge tray 302.

Figure 2A:
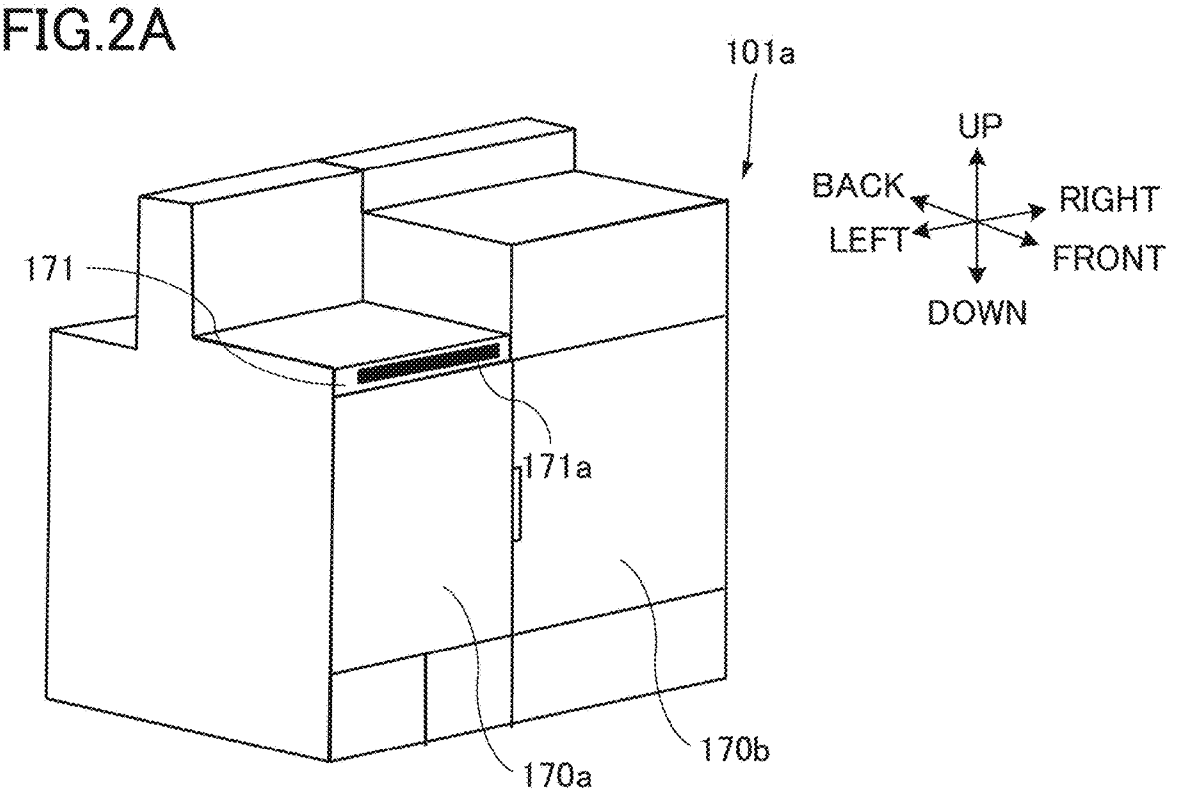
FIG. 2A is a left-side perspective view illustrating a state in which a front door of the image forming apparatus is closed.
Figure 2B:
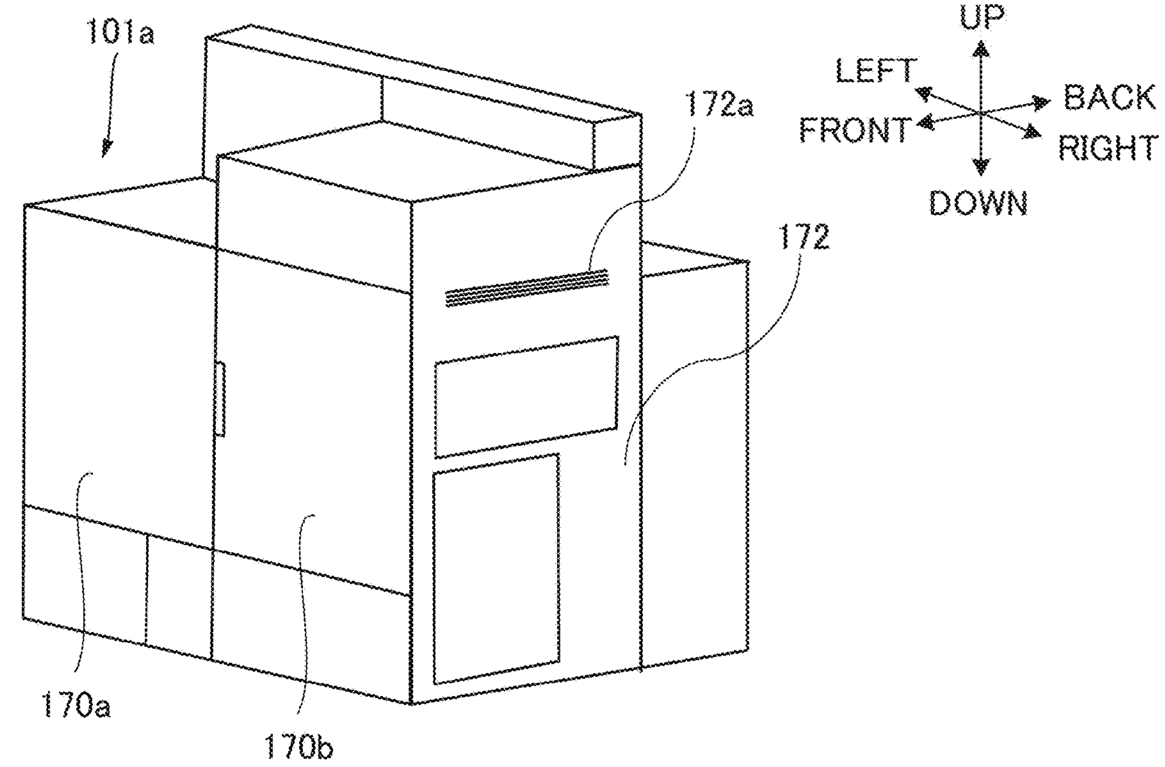
FIG. 2B is a right-side perspective view illustrating a state in which the front door of the image forming apparatus is closed.

Next, an airflow configuration in the first casing 101*a* will be described based on FIGS. 2A to 6 with reference to FIG. 1. As illustrated in FIG. 2A, a left front door 170*a* and a right front door 170*b* serving as an outer cover are disposed on the front side of the first casing 101*a* in a manner capable of opening and closing in a gatefold from an approximately center area in the right-left direction, as illustrated in the drawing. The left front door 170*a* constitutes a first outer cover and the right front door 170*b* constitutes a second outer cover. The left front door 170*a* and the right front door 170*b* constitute a part of an exterior of the image forming apparatus 100. An air intake cover 171 is disposed on an upper portion of the left front door 170*a*, and an air intake port 171*a* facing the front side is formed on the air intake cover 171. Further, as illustrated in FIG. 2B, a right cover 172 is disposed on a right side face of the first casing 101*a*, and an air intake port 172*a* is formed on the right cover 172.

Air Blowing Unit

Figure 3:
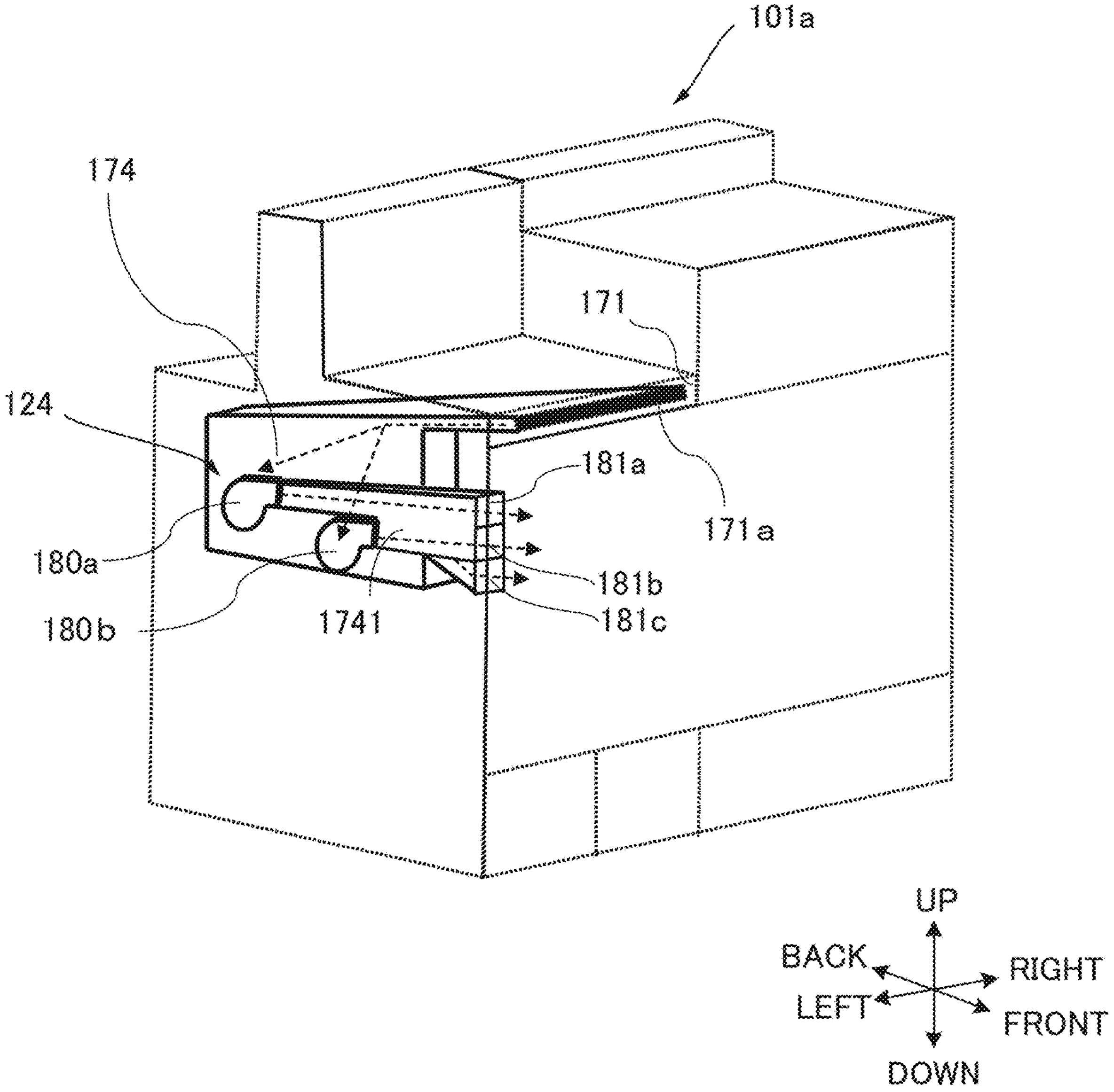
FIG. 3 is a perspective view illustrating a left-side air blowing unit.

As illustrated in FIG. 3, a left-side air blowing unit 124 having a fan for taking in air through the air intake port 171*a* and blowing air is arranged on the left side face of the first casing 101*a*. The left-side air blowing unit 124 includes a left-side main duct 174, blower fans 180*a* and 180*b*, and a side face duct 1741. Air taken in through the air intake port 171*a* is passed through the left-side air blowing unit 124 and an inner cover unit 125 described below and blown toward the developing units 1*a* to 1*d* and the charging units 2*a* and 2*b* supported on the first casing 101*a*. The left-side main duct 174 is a duct having a space communicated with the air intake port 171*a* formed in an interior thereof.

The blower fans 180*a* and 180*b* and the side face duct 1741 are arranged on a left side face of the left-side main duct 174. That is, a communication port communicated with the blower fans 180*a* and 180*b* is formed on the left-side main duct 174, and air taken in through the air intake port 171*a* by the operation of the blower fans 180*a* and 180*b* is passed through the inner side of the left-side main duct 174. Air taken in through the air intake port 171*a* is passed through a filter not shown where dust and the like contained in the air is removed. Ducts 181*a*, 181*b*, and 181*c* are formed in an interior of the side face duct 1741. The side face duct 1741 and the blower fans 180*a* and 180*b* are connected such that the air passed through the blower fans 180*a* and 180*b* flows through the ducts 181*a* and 181*b* (refer to dotted arrows).

Although not shown, four blower fans not shown are arranged on a right side face opposite to the side on which the side face duct 1741 is arranged on the left-side main duct 174. Each of the four blower fans not shown is capable of taking in external air of the image forming apparatus 100 via the air intake port 171*a*. The air taken in by four blower fans disposed on the right side face of the left-side main duct 174 is sent toward the air blowing destination via the duct 181*c*, for example. Components other than the ducts 181*a* to 181*c* have been omitted from the drawing, but the left-side air blowing unit 124 includes air blower ducts corresponding to each air blowing destination, which are the developing units 1*a* to 1*d* and the charging units 2*a* and 2*b*.

Figure 4:
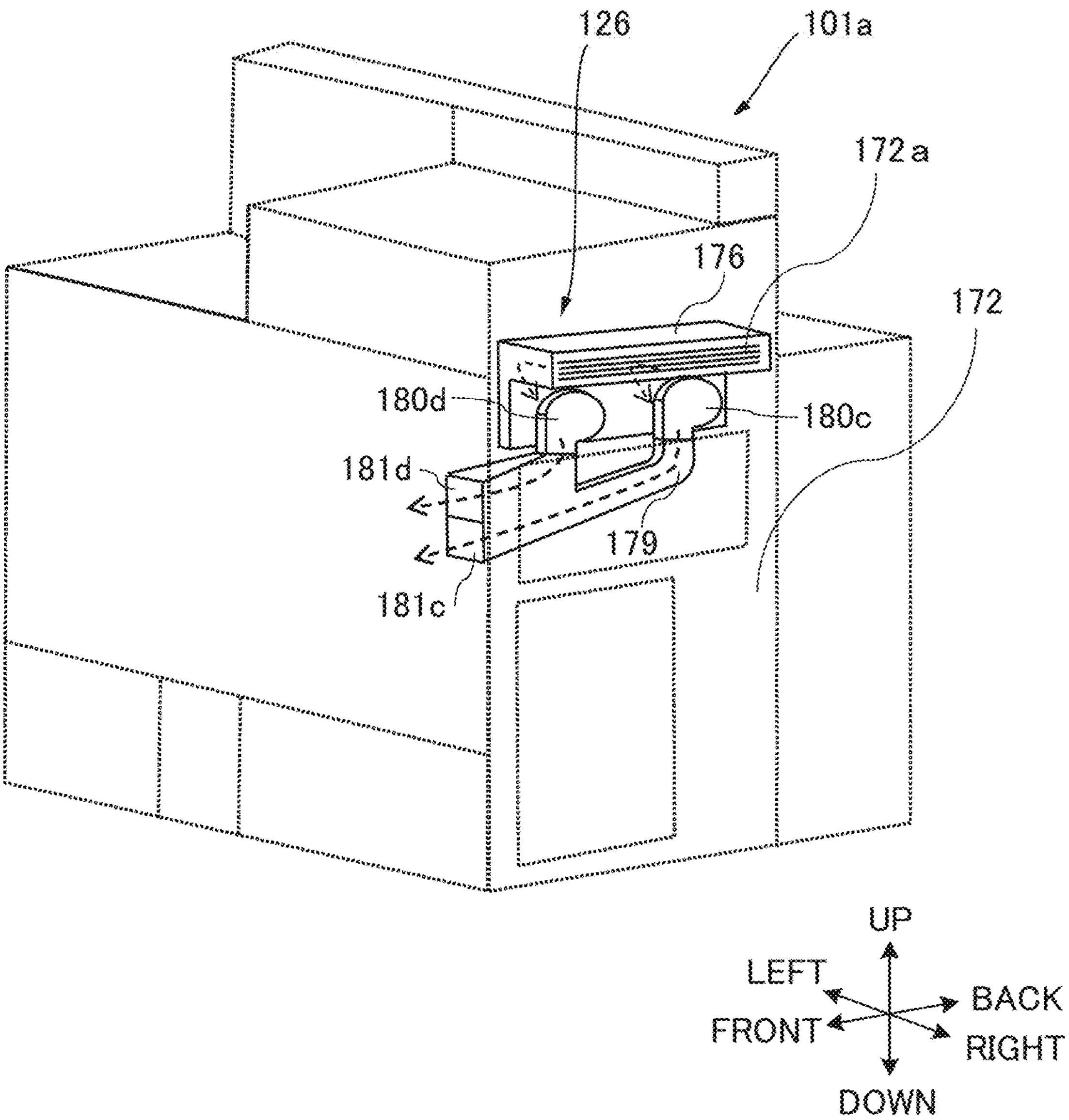
FIG. 4 is a perspective view illustrating a right-side air blowing unit.

As illustrated in FIG. 4, a right-side air blowing unit 126 having a fan for taking in air through the air intake port 172*a* and blowing the same is arranged on the right side face of the first casing 101*a*. The right-side air blowing unit 126 includes a right-side main duct 176, blower fans 180*c* and 180*d*, and a passage duct 179. Air taken in through the air intake port 172*a* is passed through the right-side air blowing unit 126 and the inner cover unit 125 described below and blown toward charging units 2*c* and 2*d* supported on the first casing 101*a*. The right-side main duct 176 is a duct having a space formed in an interior thereof communicated with the air intake port 172*a* formed on the right side face of the image forming apparatus 100.

The blower fans 180*c* and 180*d* and the passage duct 179 are arranged on a right side face of the right-side main duct 176. That is, a communication port communicated with the blower fans 180*c* and 180*d* is formed on the right-side main duct 176, and air taken in through the air intake port 172*a* is passed through the inner side of the right-side main duct 176 according to the operation of the blower fans 180*c* and 180*d*. Air taken in through the air intake port 172*a* is passed through a filter not shown where dust and the like contained in the air is removed. Ducts 181*c* and 181*d* are formed in an interior of the passage duct 179. The passage duct 179 and the blower fans 180*c* and 180*d* are connected such that the air passed through the blower fans 180*c* and 180*d* flows through the ducts 181*c* and 181*d* (refer to dotted arrows). The blower fans 180*a* to 180*d* can be sirocco fans, for example.

As illustrated in FIGS. 3 and 4, the blower fans 180*a* to 180*d* are arranged on the right and left side faces of the first casing 101*a*. Further, the blower fans 180*a* to 180*d* are arranged at a far position in the front-back direction from the front side where the user operating the operation portion 200 stands, and are positioned deeper than the front side of the first casing 101*a*. Therefore, the user operating the image forming apparatus 100 from the front side of the apparatus will not be affected by the noise from the fans. Further, the increase in size of the front side of the first casing 101*a* with respect to the conveyance path of the recording material S can be suppressed, and the first casing 101*a* can be prevented from protruding toward the front side from the sheet feeding apparatus (not shown) or the finisher apparatus 300 that are connected upstream and downstream of the second casing 101*b* or the image forming apparatus 100. Thereby, higher freedom of design is enabled. Moreover, by having air discharged from the rear side of the first casing 101*a* and having air taken in through the air intake ports 171*a* and 172*a* provided on the front side and side face of the first casing 101*a*, air that is not influenced by the heat of the discharged air can be taken in, such that the deterioration of cooling efficiency can be suppressed.

Figure 5:
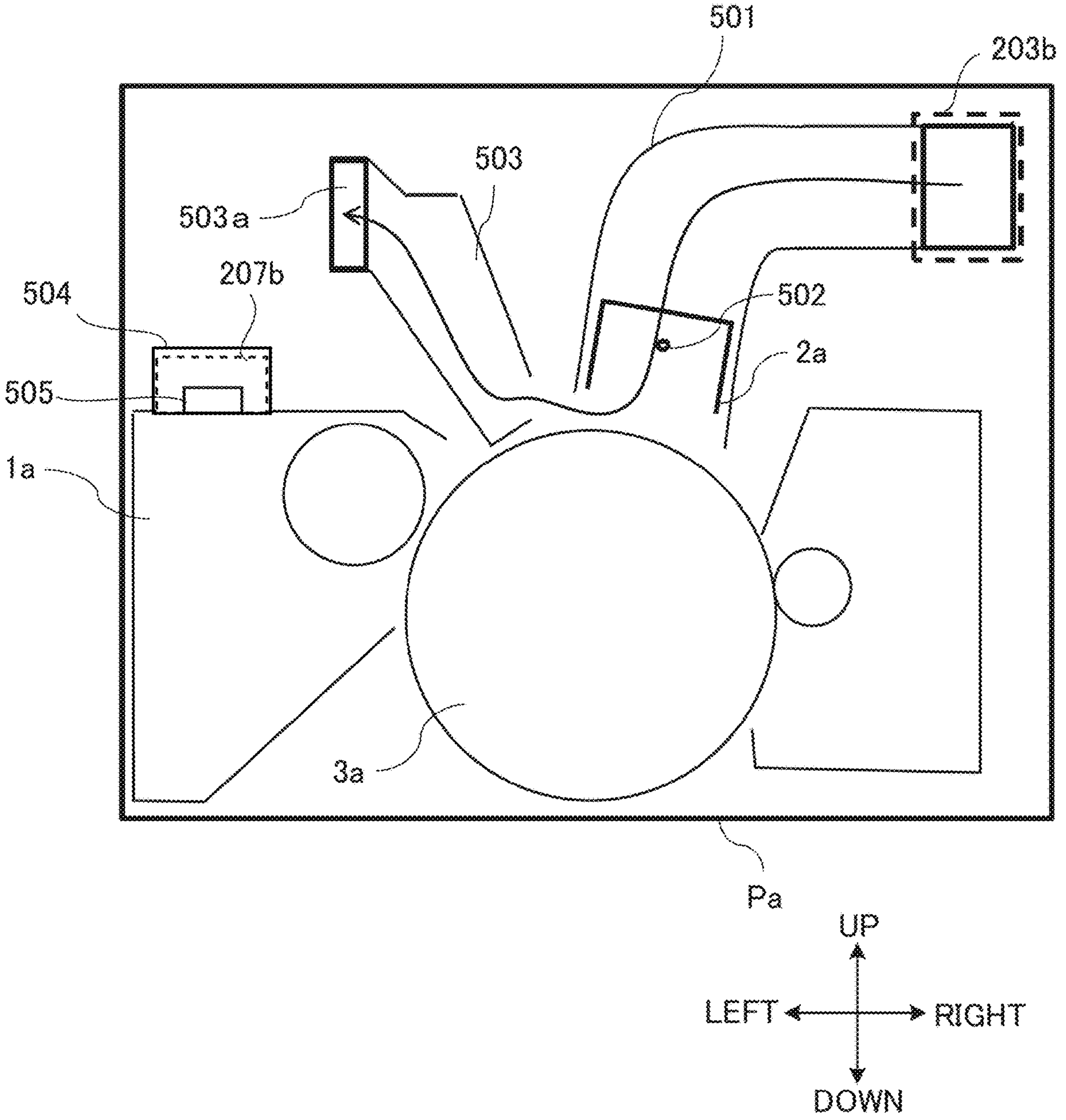
FIG. 5 is a schematic drawing illustrating an airflow to a charging unit.

FIG. 5 illustrates an air flow configuration for flowing air toward the image forming portion Pa as an example. In the charging unit 2*a*, the surface of the photosensitive drum 3*a* is charged by ionizing air surrounding a charging wire 502 by corona discharge and generating ion. In that state, the charging unit 2*a* generates ozone in addition to ion. Ozone must be collected since it causes corrosion of a grid (not shown) made of stainless steel included in the charging unit 2*a*. In order to collect ozone by sending the air to an ozone collecting filter 503*a*, an air blow duct 501 for blowing air to the charging unit 2*a* and an air discharge duct 503 for discharging air to the exterior via the ozone collecting filter 503*a* are arranged in a vicinity of the charging unit 2*a*.

A heat sink 505 made of aluminum and a cooling duct 504 are provided in the developing unit 1*a*. Air sent from an air outlet port 2076 provided on the inner cover unit described below passes via the cooling duct 504 and through the heat sink 505 while absorbing heat, cooling the developing unit 1*a*. The air passed through the cooling duct 504 is discharged to the exterior of the apparatus by an air discharge fan not shown.

Figure 6:
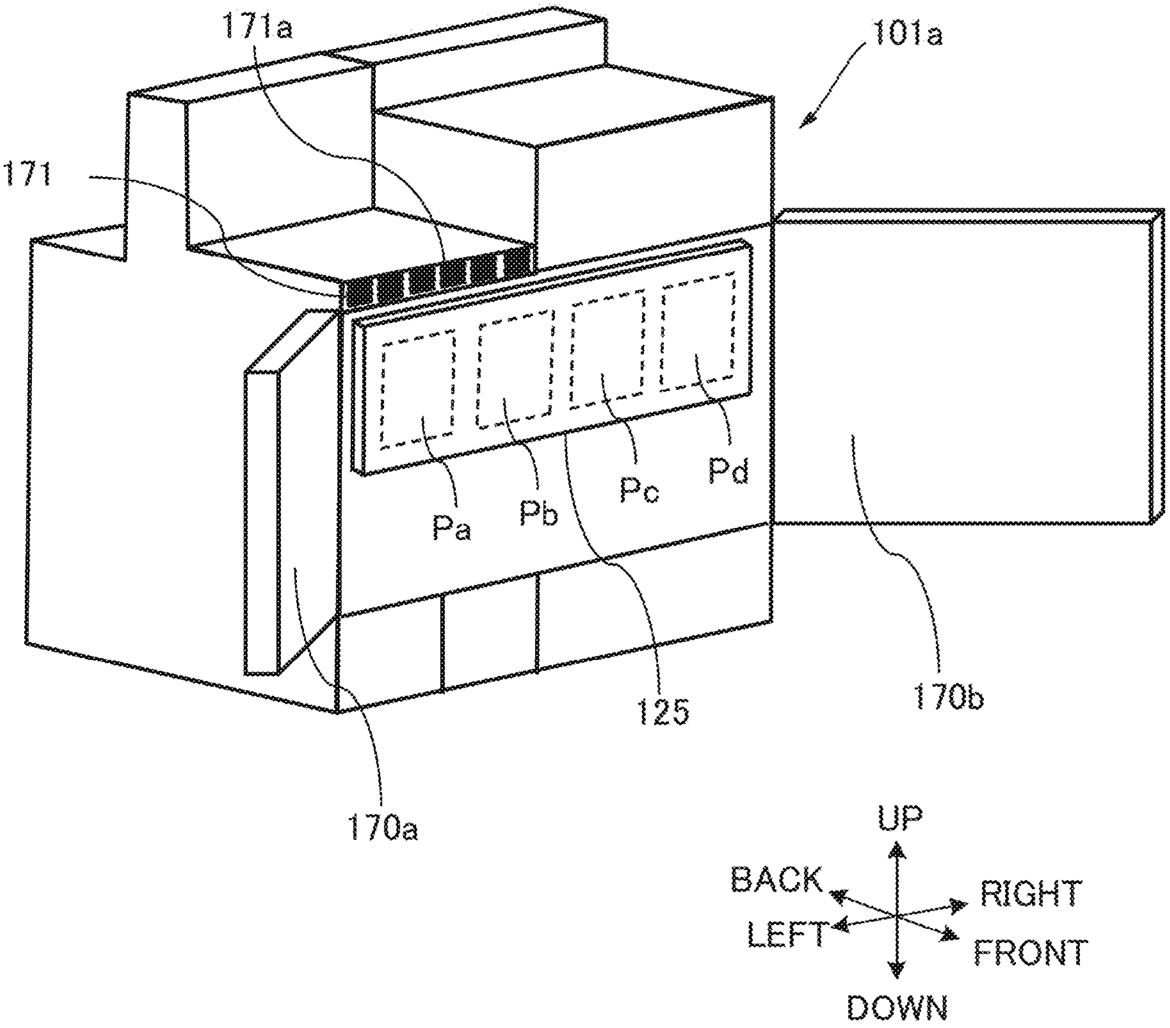
FIG. 6 is a perspective view illustrating a state in which the front door of the image forming apparatus is opened.

As illustrated in FIG. 6, the inner cover unit 125 is provided on the front side of the first casing 101*a* so as to cover the image forming portions Pa to Pd which are aligned within the first casing 101*a* on the inner sides of the left front door 170*a* and the right front door 170*b*. The inner cover unit 125 prevents the user from erroneously touching power supply portions or driven portions of the image forming portions Pa to Pd aligned within the first casing 101*a* when the front doors 170*a* and 170*b* are opened. However, the inner cover unit 125 is detachably attached to the first casing 101*a* so as to allow maintenance operators to perform maintenance operations.

According to the present embodiment, the image forming portions Pa and Pb are supported on the first casing 101*a* at a position opposed to the left front door 170*a* in the closed state, and the image forming portions Pc and Pd are supported on the first casing 101*a* at a position opposed to the right front door 170*b* in the closed state. In other words, the image forming portions Pa and Pb are arranged on the left side from the center when viewed from the front side, and the image forming portions Pc and Pd are arranged on the right side from the center when viewed from the front side.

Inner Cover Unit

Figure 7A:
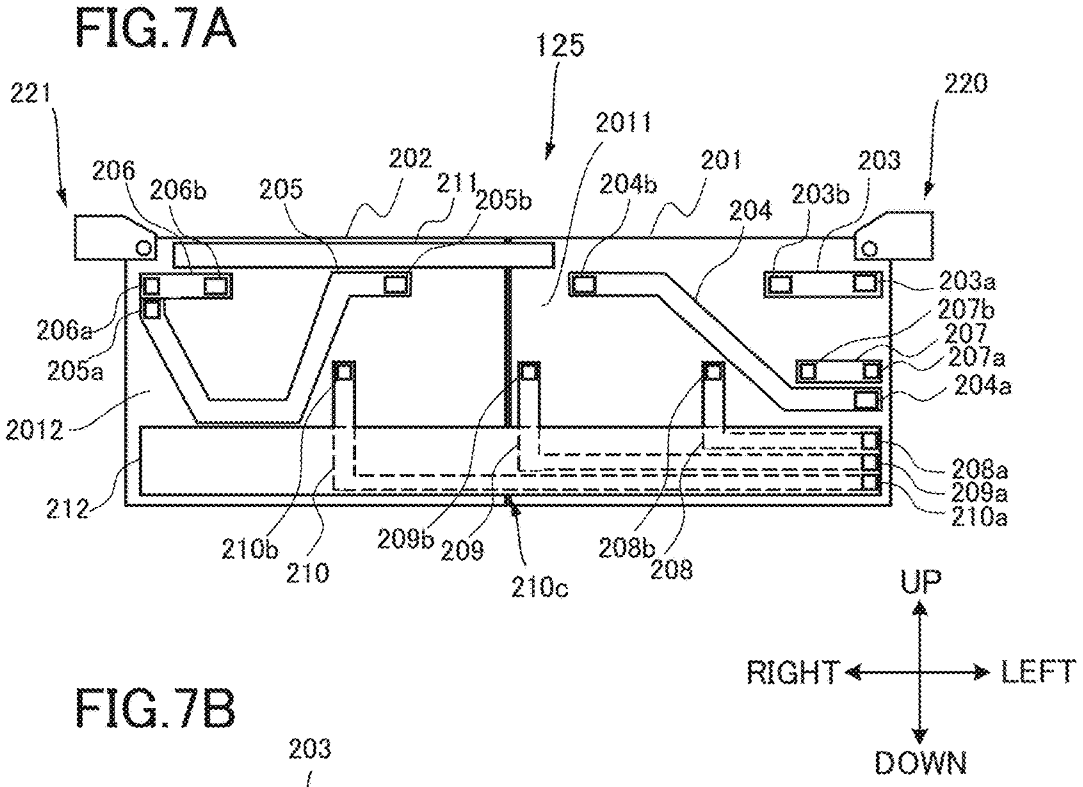
FIG. 7A is a schematic drawing illustrating an inner surface side of an inner cover unit according to a first embodiment.
Figure 7B:
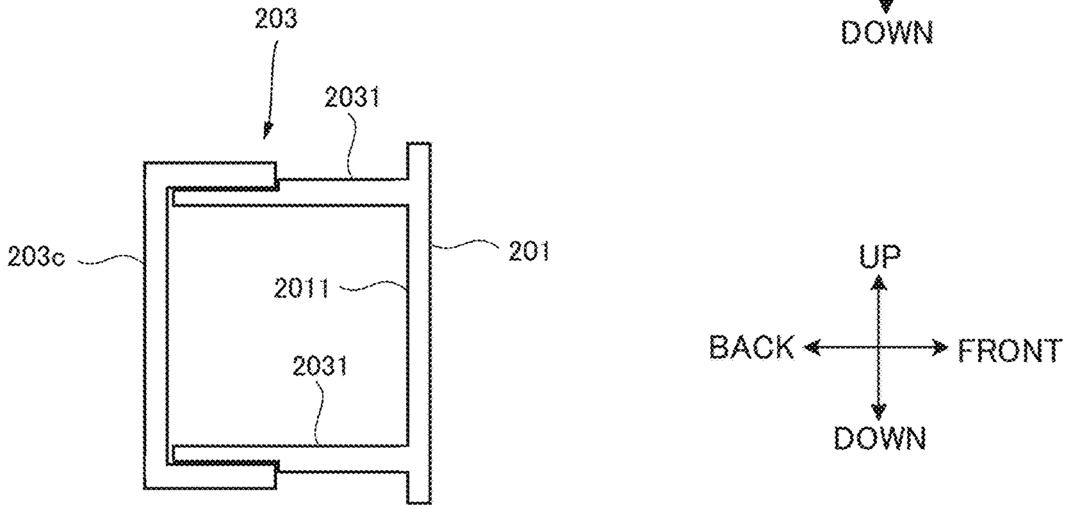
FIG. 7B is a vertical cross-sectional view illustrating a duct configuration.

Next, the inner cover unit 125 will be described based on FIGS. 7A to 7C with reference to FIGS. 1, 2A, 2B, and 6. FIG. 7A is a schematic drawing illustrating an inner surface side of the inner cover unit 125 according to the first embodiment. As illustrated in FIG. 7A, the inner cover unit 125 according to the present embodiment includes a first inner cover 201, and a second inner cover 202 arranged adjacent to the first inner cover 201 with respect to the right-left direction, i.e., longitudinal direction. That is, the second inner cover 202 is arranged adjacent to the first inner cover 201 in a direction orthogonal to the vertical direction. For example, the first inner cover 201 is arranged so as to cover the image forming portions Pa and Pb, and the second inner cover 202 is arranged so as to cover the image forming portions Pc and Pd.

For example, the inner cover unit 125 is formed to have a right-left direction length of "1253 mm" and an up-down direction, i.e., short direction, length of "225 mm" to fit in the first casing 101*a*. In a state where the inner cover unit 125 is formed of the first inner cover 201 and the second inner cover 202, the first inner cover 201 is formed to have a right-left direction length of "675 mm" and an up-down direction length of "225 mm", and the second inner cover 202 is formed to have a longitudinal direction length of "578 mm" and a short direction length of "225 mm".

The first inner cover 201 and the second inner cover 202 described above are integrated by a reinforcing plate 211 and a reinforcing plate 212. According to the present embodiment, the reinforcing plate 211 and the reinforcing plate 212 are both arranged across the first inner cover 201 and the second inner cover 202, and they are integrated by being fixed to both the first inner cover 201 and the second inner cover 202. The reinforcing plate 211 and the reinforcing plate 212 are made of metal, and they are arranged to extend in the right-left direction at separated positions above and below a center portion in the up-down direction. These reinforcing plates 211 and 212 reinforce the first inner cover 201 and the second inner cover 202 made of resin and also suppress warping of the first inner cover 201 and the second inner cover 202.

The first inner cover 201 and the second inner cover 202 each include a plurality of ducts. The plurality of ducts included in the first inner cover 201 and the second inner cover 202 are formed into suitable shapes to allow efficient air blow in correspondence with the air blowing destination within the first casing 101*a*. Since the ducts are integrated with the first inner cover 201 and the second inner cover 202, flow paths can be formed while suppressing increase in size of the ducts.

The first inner cover 201 includes a first cover surface 2011 that faces the image forming unit and that is disposed on an opposite side to a surface, facing the left front door 170*a*, of the first inner cover 201. Further, the first inner cover 201 includes all of a plurality of ducts 203, 204, 207, 208 and 209 and a part of a duct 210 disposed on a side, on which the first cover surface 2011 is provided, of the first inner cover 201. All of the above-mentioned plurality of ducts 203, 204, 207, 208, and 209 and the part of the duct 210 constitute a first duct that guides air taken in from the exterior by rotation of the blower fans 180*a* and 180*b* to the image forming unit. Alternatively, at least one of the blower fans 180*a* and 180*b* can constitute the first fan and the other one of the blower fans 180*a* and 180*b* can be omitted. The ducts 203, 204, 207, 208, 209, and 210 include air intake ports 203*a*, 204*a*, 207*a*, 208*a*, 209*a*, and 210*a* for taking in air and air outlet ports 203*b*, 204*b*, 2076, 208*b*, 209*b*, and 210*b* for discharging air, respectively. The duct 210 is formed across both the first inner cover 201 and the second inner cover 202, as illustrated, wherein an air intake port 210*a* is arranged on the first inner cover 201 and an air outlet port 210*b* is arranged on the second inner cover 202.

Meanwhile, the second inner cover 202 includes a second cover surface 2012 that is arranged on an opposite side to the right front door 170*b* and that faces the image forming unit. The second inner cover 202 includes all of a plurality of ducts 205 and 206 and a part of the duct 210 disposed on a side, on which the second cover surface 2012 is provided, of the second inner cover 202. All of the above-mentioned ducts 205 and 206 and the part of the duct 210 constitute a second duct that guides air taken in from the exterior by rotation of the blower fans 180*c* and 180*d* to the image forming unit. Alternatively, at least one of the blower fans 180*c* and 180*d* can constitute the second fan and the other one of the blower fans 180*c* and 180*d* can be omitted. The ducts 205 and 206 include air intake ports 205*a* and 206*a* for taking in air and air outlet ports 205*b* and 206*b* for discharging air, respectively.

In the present embodiment, the duct 203 is for guiding air to the charging unit 2*a*, the duct 204 is for guiding air to the charging unit 2*b*, the duct 207 is for guiding air to the developing unit 1*a*, and the ducts 208 to 210 are for guiding air respectively to the developing units 1*b* to 1*d*. Air is sent to these ducts 203, 204, 207, 208, 209, and 210 from the left-side air blowing unit 124 illustrated in FIG. 3. The duct 205 is for sending air to the charging unit 2*d*, and the duct 206 is for sending air to the charging unit 2*c*. Air is sent to the ducts 205 and 206 from the right-side air blowing unit 126 illustrated in FIG. 4.

Next, a configuration of the ducts provided on the first inner cover 201 described above will be illustrated, taking the duct 203 as an example. As illustrated in FIG. 7B, the duct 203 is composed of a pair of ribs 2031 protruding from the first cover surface 2011 of the first inner cover 201 and designed to extend facing one another, and a duct cover 203*c* disposed so as to cover an opening of the pair of ribs 2031. The pair of ribs 2031, i.e., a first rib and a second rib, are extended in a suitable shape such that wall portions that protrude from the first cover surface 2011 and that face each other are formed across the left-side air blowing unit 124 and the charging unit 2*a*. The duct cover 203*c*, i.e., first duct cover and second duct cover, is designed to fit to the pair of ribs 2031. As described, by having the pair of ribs 2031 formed integrally to an inner side of the first inner cover 201 covered by the duct cover 203*c* formed as a separate member, the duct 203 is formed to the first inner cover 201.

Although not shown, the ducts provided on the second inner cover 202 adopt a similar configuration. For example, the duct 205 can be composed of a pair of second ribs that protrude from the second cover surface 2012 of the second inner cover 202 (refer to FIG. 7A), and a duct cover formed as a separate member disposed to cover the opening of the pair of second ribs.

Next, a duct 210 formed across the first inner cover 201 and the second inner cover 202 will be described. As described above, since the first inner cover 201 and the second inner cover 202 are formed independently, the duct 210 is designed to be divided into the first inner cover 201 side and the second inner cover 202 side. A part of the duct 210 disposed on the first inner cover 201 side is referred to as a duct 210*d*, or first duct, and a part of the duct 210 disposed on the second inner cover 202 side is referred to as a duct 210*f*, or second duct. In the present embodiment, the image forming apparatus 100 includes a connecting portion 210*c* that connects the duct 210*d* and the duct 210*f* and that guides air from one of the ducts 210*d* and 210*f* to the other.

Figure 7C:
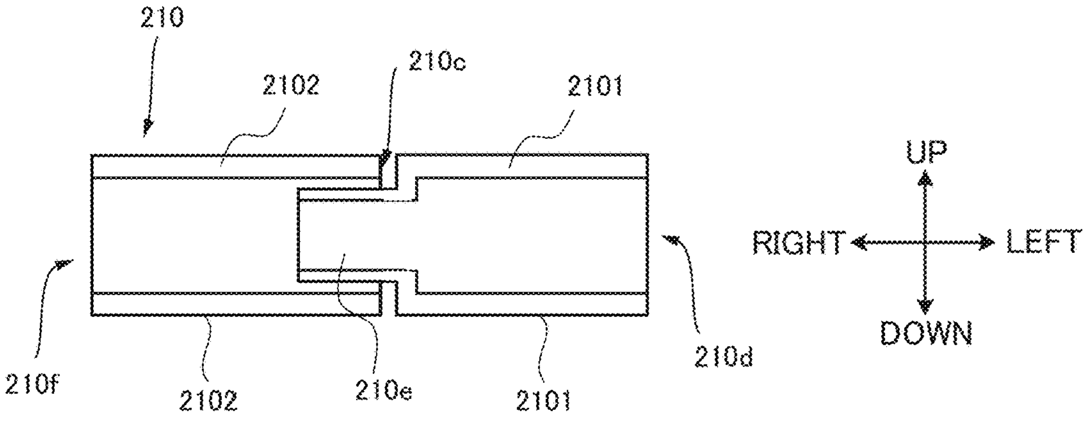
FIG. 7C is a horizontal cross-sectional view illustrating a connecting portion of ducts.

In the present embodiment, a fitting portion 210*e* protruded toward the duct 210*f* is formed on an end portion of the duct 210*d* as the connecting portion 210*c*, as illustrated in FIG. 7C. The fitting portion 210*e* is disposed to fit to an edge portion of the duct 210*f*, and the ducts 210*d* and 210*f* are connected by having the fitting portion 210*e* fit to the edge portion of the duct 210*f*. More specifically, a pair of ribs 2101 formed on the first inner cover 201 and a pair of ribs 2102 formed on the second inner cover 202 are connected. In order to do so, in the fitting portion 210*e*, the ribs 2101 are formed to face each other across a narrower distance than the distance between the ribs 2102 so that the ribs 2101 do not interfere with the ribs 2102. The duct cover described above is attached to the ribs 2101 and 2102 connected via the fitting portion 210*e* as described above. Alternatively, the fitting portion 210*e* can be disposed on the end portion of the duct 210*f* and designed to fit to the edge portion of the duct 210*d*.

As illustrated in FIG. 7A, if the reinforcing plate 212 is disposed so as to overlap with the ducts 208, 209, and 210 when viewed from the rear side, the duct cover described above can be disposed integrally on the reinforcing plate 212.

The first inner cover 201 and the second inner cover 202 described above are removably attached integrally to the first casing 101*a*. In the present embodiment, as illustrated in FIG. 7A, the image forming apparatus 100 includes a first fixing portion 220 for fixing the first inner cover 201 removably to the first casing 101*a*, and a second fixing portion 221 for fixing the second inner cover 202 removably to the first casing 101*a*.

In the present embodiment, the user or the operator can position the inner cover unit 125 having integrated the first inner cover 201 and the second inner cover 202 via the first fixing portion 220 and the second fixing portion 221 to a predetermined position or the first casing 101*a*. Further, the user or the operator can fix the attached inner cover unit 125 to the first casing 101*a*. Now, this configuration will be described based on FIGS. 8A to 8D with reference to FIGS. 2A and 7A. Since the first fixing portion 220 and the second fixing portion 221 adopt a similar configuration, the second fixing portion 221 for fixing the second inner cover 202 will be described as an example below.

As illustrated in FIG. 8A, the second fixing portion 221 includes a mounting base 214 and a lever portion 215. The mounting base 214 is fixed to the first casing 101*a*. A pin 214*a* protruding toward the front side is formed on the mounting base 214, and as illustrated in FIG. 8B, the inner cover unit 125 is positioned at a predetermined position on the first casing 101*a* by passing the pin 214*a* through a positioning hole on the second inner cover 202. The predetermined position mentioned here is a position in which the air intake ports and the air outlet ports of the plurality of ducts included in the inner cover unit 125 can guide air relatively efficiently to the left-side air blowing unit 124, the right-side air blowing unit 126, the charging units 2*a* to 2*d*, and the developing units 1*a* to 1*d*.

The lever portion 215 is disposed pivotably on the second inner cover 202. The lever portion 215 includes a shaft portion 216 that extends from the front side toward the rear side through the through hole formed on the second inner cover 202. As illustrated in FIGS. 8B and 8C, a stopper 217 is formed in a manner intersecting the shaft portion 216 at a tip of the shaft portion 216. The lever portion 215 is capable of moving between a lock position for fixing the second inner cover 202 as illustrated in FIGS. 8A and 8B, and a release position in which the fixing of the second inner cover 202 is released as illustrated in FIGS. 8C and 8D.

That is, when fixing the second inner cover 202 to the first casing 101*a*, the user positions the second inner cover 202 via the pin 214*a* before pivoting the lever portion 215 toward a locking direction. Then, the shaft portion 216 of the lever portion 215 pivots, and as illustrated in FIG. 8D, the stopper 217 moves to a position overlapped with the mounting base 214 when viewed from the front side, in other words, to a position interposing the mounting base 214 between itself and the second inner cover 202. In this state, even if the user attempts to move the second inner cover 202 toward the front side, as illustrated in FIG. 8C, the stopper 217 abuts against the mounting base 214 and the second inner cover 202 cannot be moved. If the user wishes to move the second inner cover 202 toward the front side, the user must pivot the lever portion 215 to an opposite direction as the locking direction such that the stopper 217 is moved to a position not overlapped with the mounting base 214 when viewed from the front side, as illustrated in FIG. 8B. As described, the inner cover unit 125 is fixed in a locked state so as not to fall off from the first casing 101*a*.

As described, according to the present embodiment, the inner cover unit 125 is configured in a manner divided into the first inner cover 201 and the second inner cover 202 made of resin. A plurality of ducts are formed on the first inner cover 201 and the second inner cover 202. The user can attach the inner cover unit 125 having integrated the first inner cover 201 and the second inner cover 202 to the first casing 101*a*. As described, by dividing the inner cover unit 125 into the first inner cover 201 and the second inner cover 202, a length in the longitudinal direction of components of each of the first inner cover 201 and the second inner cover 202 can be shortened. That is, by separately manufacturing the first inner cover 201 and the second inner cover 202, which are not easily warped due to its short longitudinal length, and integrating the first inner cover 201 and the second inner cover 202 thereafter, the inner cover unit 125 that is not easily warped can be formed. Since warping does not easily occur, the user can easily attach the inner cover unit 125 to the first casing 101*a*, and when the inner cover unit 125 is attached, the ducts are correctly positioned with respect to the image forming portions Pa to Pd, which are the air blowing destinations.

Further, since a small machining device can be used when manufacturing the first inner cover 201 and the second inner cover 202 through injection molding, manufacturing costs can be suppressed. This is because when injection molding is performed to form an inner cover having an integrated rectangular shape in which the difference between longitudinal and short directions is great, molding must be performed in a large-scale machining device corresponding to the longitudinal size, but since it is difficult to arrange many large-scale components simultaneously, useless blanks are formed by molding and space efficiency is deteriorated, such that high costs related to the large-scale molding device have a great impact on the costs of each component. Furthermore, a long integrated rectangular component requires much space for storage and shipping, and the management and shipping costs are increased, such that divided components can suppress related costs.

Second Embodiment

Next, an inner cover unit 125A according to a second embodiment will be described with reference to FIGS. 9A to 9C. In the following description, regarding the inner cover unit 125A of the second embodiment, components similar to the inner cover unit 125 of the first embodiment described above (refer to FIG. 7A) are denoted with the same reference numbers, and descriptions thereof are omitted.

Figure 9A:
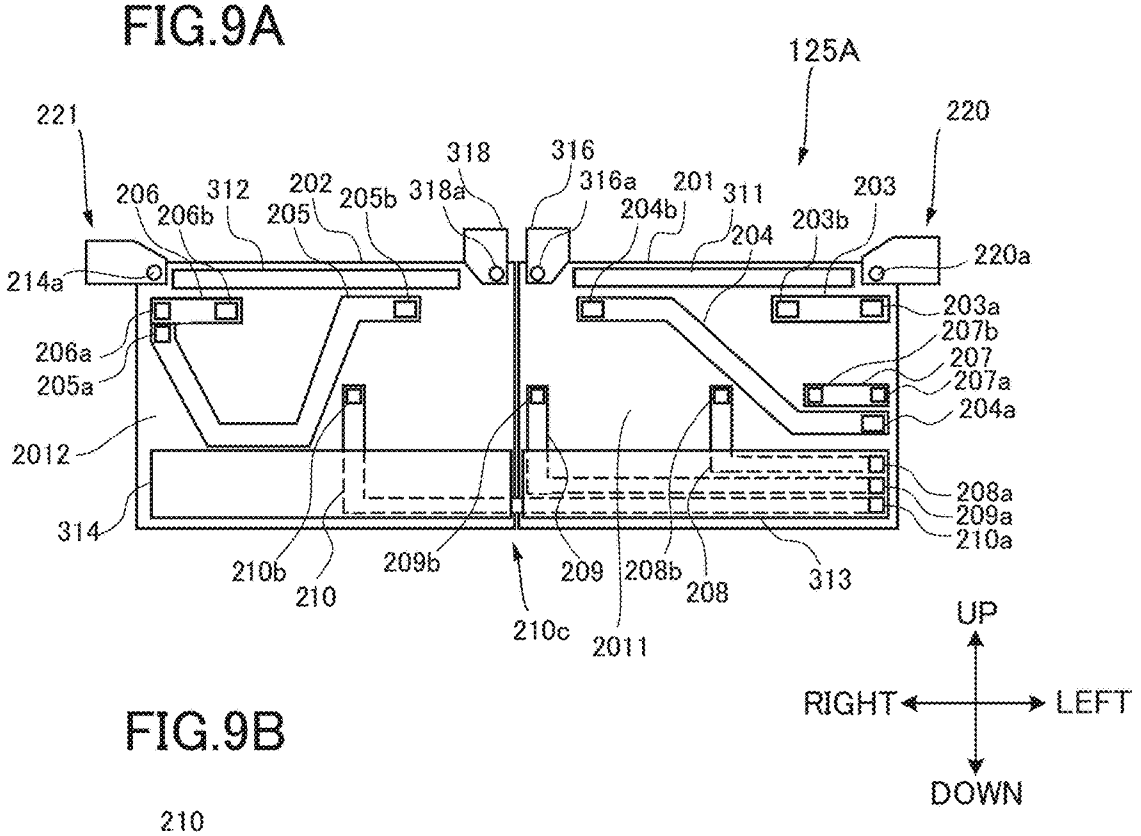
FIG. 9A is a schematic drawing illustrating an inner surface side of an inner cover unit according to a second embodiment.

As illustrated in FIG. 9A, in the inner cover unit 125A, first reinforcing plates 311 and 313 made of metal are fixed to the first inner cover 201. The first reinforcing plates 311 and 313 are arranged so as not to cross over to the second inner cover 202. In other words, the first reinforcing plates 311 and 313 are arranged so as to be overlapped with the first inner cover 201 but not to be overlapped with the second inner cover 202 when viewed in the front-back direction. Further, second reinforcing plates 312 and 314 made of metal are fixed to the second inner cover 202. The second reinforcing plates 312 and 314 are arranged so as not to cross over to the first inner cover 201. In other words, the second reinforcing plates 312 and 314 are arranged so as to be overlapped with the second inner cover 202 but not to be overlapped with the first inner cover 201 when viewed in the front-back direction. The first reinforcing plates 311 and 313 reinforce the first inner cover 201 and also suppress the occurrence of warping. The second reinforcing plates 312 and 314 reinforce the second inner cover 202 and also suppress the occurrence of warping.

As described, the inner cover unit 125A does not have a reinforcing plate that is arranged across the first inner cover 201 and the second inner cover 202, unlike the inner cover unit 125 of the first embodiment. Therefore, the first inner cover 201 and the second inner cover 202 can each be independently attached to and detached from the first casing 101*a*, and by fixing the first inner cover 201 and the second inner cover 202 separately, the inner cover unit 125A is attached to the first casing 101*a*.

In order to fix the first inner cover 201 to the first casing 101*a*, in addition to providing the first fixing portion 220 described above, a mounting base portion 316 having a pin 316*a* is provided on the first casing 101*a*. Further, in order to fix the second inner cover 202 to the first casing 101*a*, in addition to providing the second fixing portion 221 described above, a mounting base portion 318 having a pin 318*a* is provided on the first casing 101*a*. That is, the first inner cover 201 is positioned at a predetermined position on the first casing 101*a* by being inserted to a pin 220*a* of the first fixing portion 220 and the pin 316*a* of the mounting base portion 316. The second inner cover 202 is positioned at a predetermined position on the first casing 101*a* by being inserted to the pin 214*a* of the second fixing portion 221 and the pin 318*a* of the mounting base portion 318.

Figure 9B:
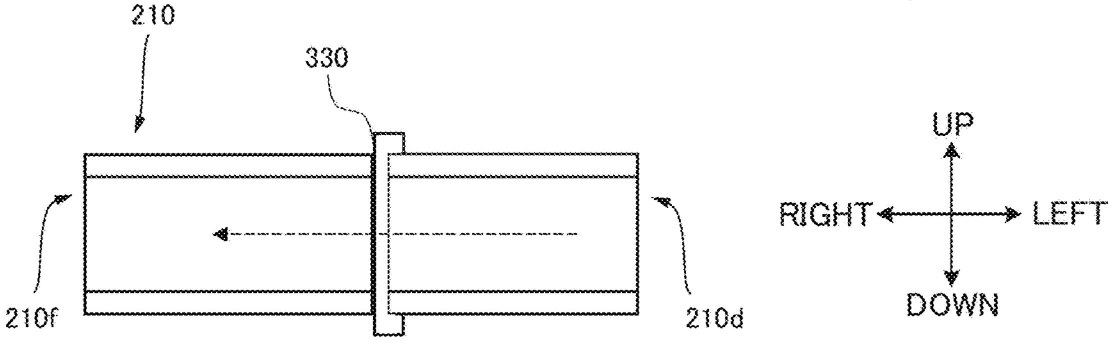
FIG. 9B is a schematic drawing illustrating a connecting portion of ducts.

As illustrated in FIG. 9B, a seal member 330 is arranged at a joint between the duct 210*d* and the duct 210*f*. The seal member 330 is disposed on at least either one of the duct 210*d* and the duct 210*f*, sealing and filling a gap formed at the joint between the ducts 210*d* and 210*f* so as to prevent leakage of air from the joint between the ducts 210*d* and 210*f*. The seal member 330 can be a sponge, for example. The ducts 210*d* and 210*f* can also be connected by the fitting portion 210*e* described above (refer to FIG. 7C).

In that case, however, the order for removing the first inner cover 201 and the second inner cover 202 is determined by which of the first inner cover 201 and the second inner cover 202 the fitting portion 210*e* is provided to. For example, as illustrated in FIG. 7C, in a case where the fitting portion 210*e* is disposed on the duct 210*d* on the first inner cover 201 side, the user can only open the first inner cover 201 after opening the second inner cover 202 first. In contrast, in a configuration where only the seal member 330 is disposed to connect the duct 210*d* and the duct 210*f*, there is no determined order for removing the first inner cover 201 and the second inner cover 202, so that it is possible to remove only one of the two ducts. Thereby, if maintenance of only the image forming portion Pa is required, for example, maintenance of the image forming portion Pa can be performed by removing only the first inner cover 201. According to this configuration, the workability during maintenance of the image forming portions Pa to Pd covered by the first inner cover 201 and the second inner cover 202 can be improved.

Figure 9C:
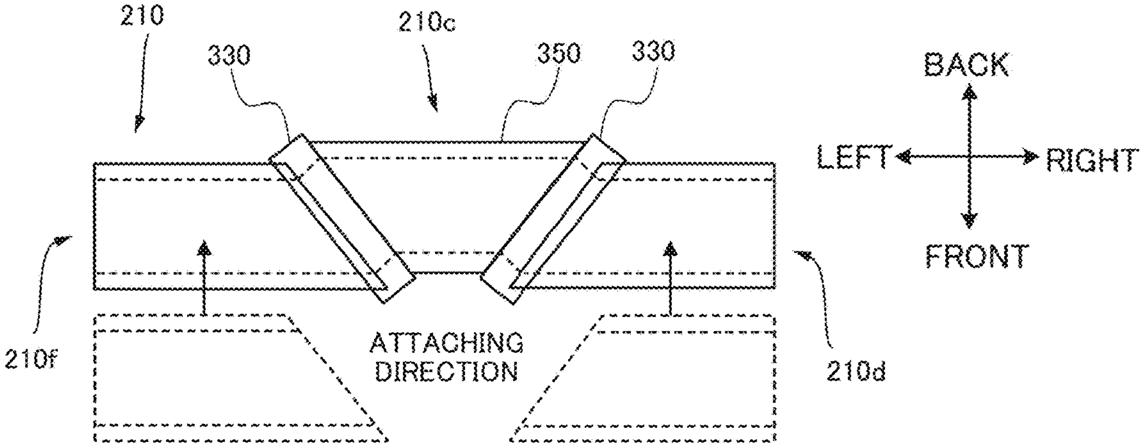
FIG. 9C is a schematic drawing illustrating a relay duct.

Further, the ducts 210*d* and 210*f* can be connected via a relay duct 350 serving as the connecting portion 210*c*, as illustrated in FIG. 9C. The relay duct 350 is fixed to the first casing 101*a*. In a state where the first inner cover 201 and the second inner cover 202 are attached to the first casing 101*a*, a first end side of the relay duct 350 is fit to and connected with the duct 210*d* and a second end thereof is fit to and connected with the duct 210*f*, by which a flow path for guiding air from the duct 210*d* to the duct 210*f* is formed. The seal member 330 is disposed on both end portions on the first end side and the second end side of the relay duct 350, and the seal member 330 seals and fills the gap formed at the joints between the relay duct 350 and the duct 210*d* or the duct 210*f* so as to prevent leakage of air from the joints. According to this configuration, the gaps formed at the joints of the ducts according to the configuration illustrated in FIG. 9B can be reduced, such that loss of airflow can be suppressed.

According to the second embodiment described above, the user can attach the inner cover unit 125A to the first casing 101*a* by attaching the first inner cover 201 and the second inner cover 202 separately. That is, prior to attachment, the inner cover unit 125A is divided into the first inner cover 201 and the second inner cover 202, and the first inner cover 201 and the second inner cover 202 are attached separately, by which the inner cover unit 125A that has been integrated after attachment is provided. Thereby, compared to the attachment of the inner cover unit 125 (refer to FIG. 7A) in which the first inner cover 201 and the second inner cover 202 are integrated prior to attachment, the user can easily attach the inner over unit 125A to the first casing 101*a*.

Other Embodiments

According to the second embodiment described above, an example has been illustrated in which the first inner cover 201 and the second inner cover 202 are fixed to the first casing 101*a* in a closed state via the fixing portions (220, 221) and the mounting base portions (316, 318), but the present technique is not limited to this example. For example, the first inner cover 201 and the second inner cover 202 can be disposed in an openable and closable manner with respect to the first casing 101*a*. Hereafter, an example in which the first inner cover 201 and the second inner cover 202 are disposed in an openable and closable manner will be described with reference to FIGS. 10A to 10C. The configurations similar to the inner cover unit 125A of second embodiment (refer to FIG. 9A) will be denoted with the same reference numbers, and descriptions thereof are omitted.

Figure 10A:
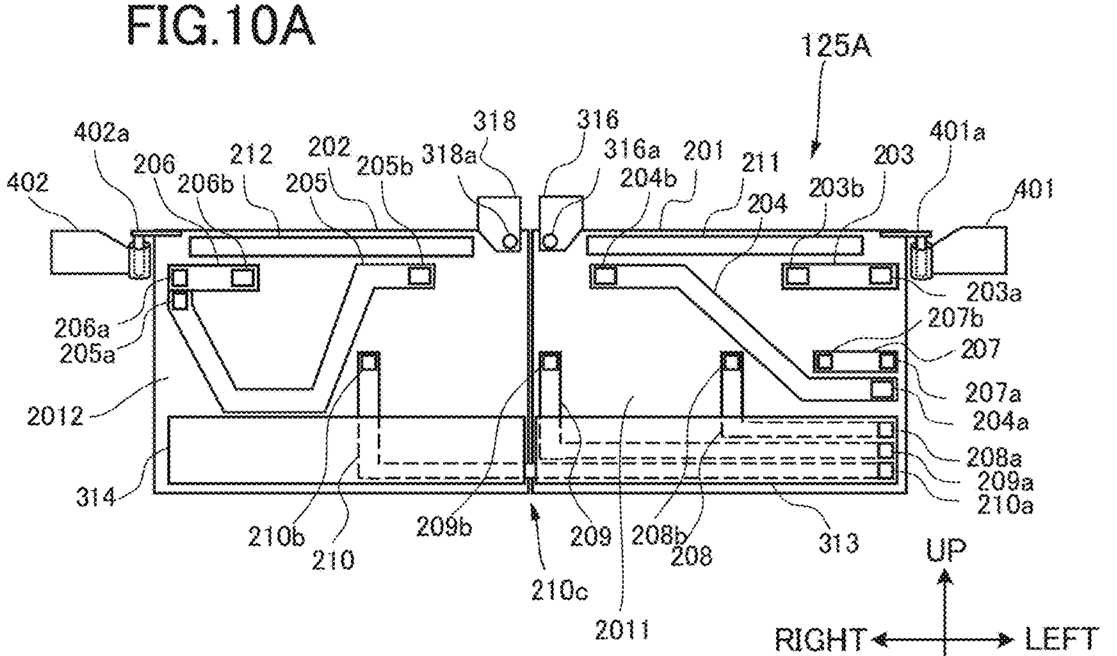
FIG. 10A is a schematic drawing illustrating the inner surface side of the inner cover unit in which a first inner cover and a second inner cover are openable and closable.

As illustrated in FIG. 10A, the first inner cover 201 includes a first pivot shaft 401*a* at a first end portion, and the first inner cover 201 is disposed in an openable and closable manner by pivoting with respect to the first casing 101*a* about the first pivot shaft 401*a*. The first pivot shaft 401*a* is attached to a hinge support plate 401 fixed to the first casing 101*a*. The first inner cover 201 is inserted to the pin 316*a* of the mounting base portion 316 in a closed state and positioned at a predetermined position on the first casing 101*a*.

Meanwhile, the second inner cover 202 includes a second pivot shaft 402*a* at an end portion, far from the first end portion, of the first inner cover 201, and the second inner cover 202 is disposed in an openable and closable manner by pivoting with respect to the first casing 101*a* about the second pivot shaft 402*a*. The second pivot shaft 402*a* is attached to a hinge support plate 402 fixed to the first casing 101*a*. The second inner cover 202 is inserted to the pin 318*a* of the mounting base portion 318 in a closed state and positioned at a predetermined position on the first casing 101*a*.

Figure 10B:
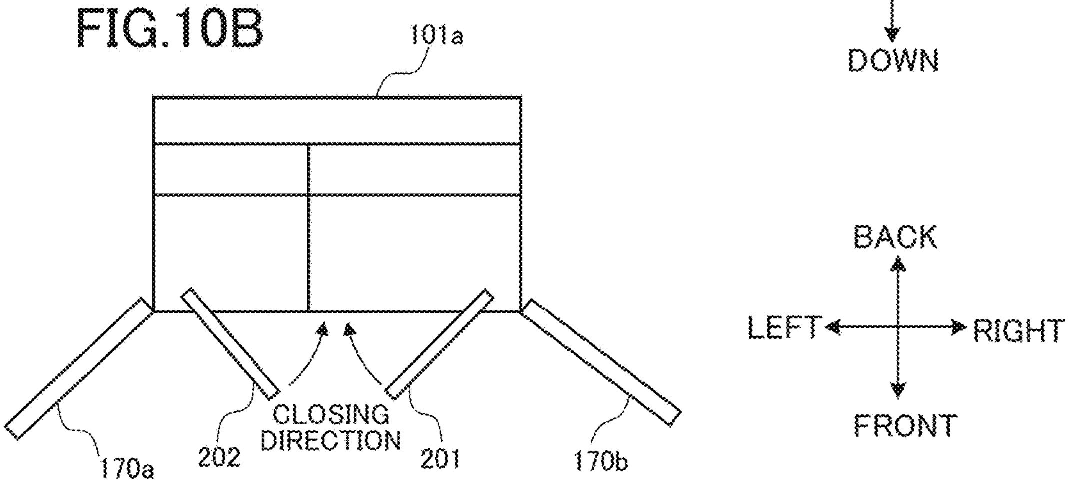
FIG. 10B is a schematic diagram illustrating an opening and closing operation of the first and second inner covers.
Figure 10C:
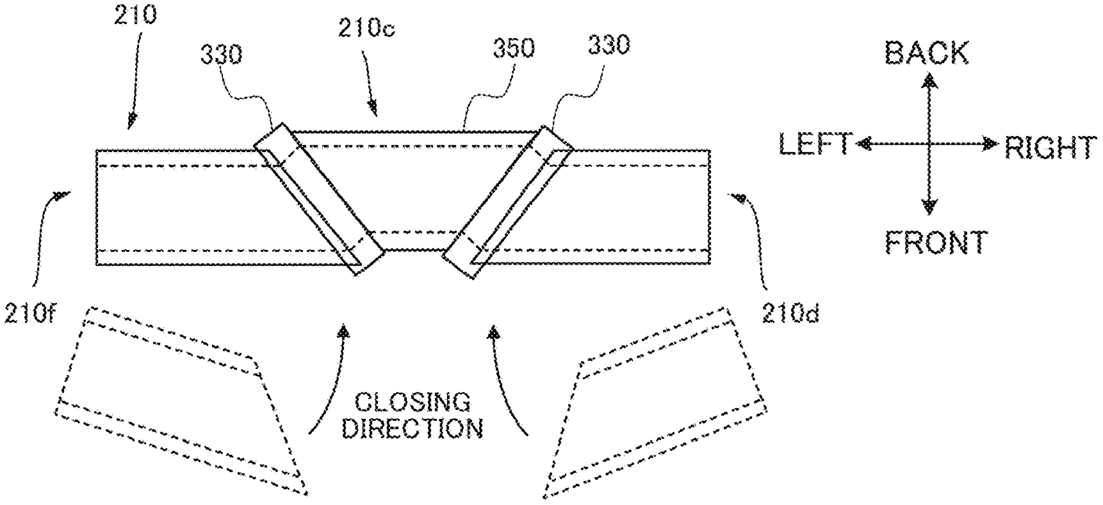
FIG. 10C is a schematic drawing illustrating a relay duct.

As illustrated in FIG. 10B, in a state where the front doors (170*a*, 170*b*) are opened, the first inner cover 201 and the second inner cover 202 are opened and closed separately in right and left directions. As described, in a state where the first inner cover 201 and the second inner cover 202 are disposed in an openable and closable manner, as illustrated in FIG. 10C, it is preferable to adopt the relay duct 350 mentioned above to allow the ducts 210*d* and 210*f* to connect to and disconnect from each other in response to the opening and closing operation.

The ducts 210*d* and 210*f* can be connected by the fitting portion 210*e* described above (refer to FIG. 7C). However, in that case, the order in which the first inner cover 201 and the second inner cover 202 are opened and closed is determined based on whether the fitting portion 210*e* is disposed on the first inner cover 201 or the second inner cover 202. For example, as illustrated in FIG. 7C, in a state where the fitting portion 210*e* is disposed on the duct 210*d* on the first inner cover 201 side, the user cannot open the first inner cover 201 unless the second inner cover 202 is opened first.

In contrast, when the relay duct 350 is provided, there is no set order for opening and closing the first inner cover 201 and the second inner cover 202, such that even only one of the covers can be opened. Thereby, for example, if only the image forming portion Pa requires maintenance, the first inner cover 201 alone can be opened to perform maintenance operation of the image forming portion Pa. According to this configuration, the workability during maintenance of the image forming portions Pa to Pd that are covered by the first inner cover 201 and the second inner cover 202 is improved.

An example has been illustrated above of a case where the first inner cover 201 and the second inner cover 202 are configured as a gatefold cover in which the covers are opened and closed separately in opposite right-left directions, but the opening and closing directions are not limited thereto. The first inner cover 201 and the second inner cover 202 can be designed to open and close in the same right or left direction, or they can be designed to open and close in the up-down direction. Further, the first inner cover 201 and the second inner cover 202 can be designed to open and close integrally.

The above-described embodiment illustrated an example in which the first inner cover 201 covers the image forming portions Pa and Pb, and the second inner cover 202 covers the image forming portions Pc and Pd, but the present embodiment is not limited thereto. For example, among the plurality of image forming portions Pa to Pb, only the image forming portion Pa, i.e., first image forming unit, positioned closest to the first end in the longitudinal direction, that is, in the direction along which the image forming portions Pa to Pb are aligned, can be covered by the first inner cover 201, and the other image forming portions Pb, Pc, and Pk including the image forming portion Pk, i.e., second image forming unit, positioned closest to the second end in the longitudinal direction can be covered by the second inner cover 202.

According further to the above-described embodiment, the inner cover unit 125 is divided into two parts, which are the first inner cover 201 and the second inner cover 202, but the present technique is not limited thereto. For example, the inner cover unit 125 can be divided into three parts or more. Even further, the divided inner cover does not necessarily have to include the duct.

According further to the above-described embodiment, the ducts 203, 204, 207, 208, 209, and 210 are disposed on the first cover surface 2011 side of the first inner cover 201, and the ducts 205 and 206 are disposed on the second cover surface 2012 side of the second inner cover 202, but the present technique is not limited thereto. That is, the ducts 203, 204, 207, 208, 209, and 210 can be disposed in any area of the first inner cover 201 as long as they are capable of guiding the air taken in from the exterior to the image forming unit. The ducts 205 and 206 can also be disposed in any area of the second inner cover 202 as long as they are capable of guiding the air taken in from the exterior to the image forming unit. On which of the first inner cover 201 and the second inner cover 202 each of the ducts 203, 204, 205, 206, 207, 208, 209, and 210 are arranged can be determined arbitrarily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-051433, filed Mar. 28, 2022, which is hereby incorporated by reference herein in its entirety.

What is claimed is:

1. An image forming apparatus comprising:
- a casing;
- an image forming unit disposed in the casing;
- an outer cover configured to be arranged in an open state and a closed state with respect to the casing;
- a first inner cover made of resin and arranged to face an inner side of the outer cover in the closed state, the first inner cover including a first duct;
- a second inner cover made of resin and arranged to face the inner side of the outer cover in the closed state, the second inner cover including a second duct; and
- a seal configured to seal a joint between the first duct and the second duct.

2. The image forming apparatus according to claim 1, wherein:
- the first inner cover includes a first cover surface that is disposed on an opposite side to a surface, facing the outer cover, of the first inner cover and that faces the image forming unit,
- the second inner cover includes a second cover surface that is disposed on an opposite side to a surface, facing the outer cover, of the second inner cover and that faces the image forming unit,
- the first duct is disposed on a side, on which the first cover surface is provided, of the first inner cover, and
- the second duct is disposed on a side, on which the second cover surface is provided, of the second inner cover.

3. The image forming apparatus according to claim 1, wherein:

the first inner cover includes a first cover surface that is disposed on an opposite side to a surface, facing the outer cover, of the first inner cover and that faces the image forming unit, the second inner cover includes a second cover surface that is disposed on an opposite side to a surface, facing the outer cover, of the second inner cover and that faces the image forming unit, the first duct includes:

a pair of first ribs configured to protrude from the first cover surface and extend in a manner opposing one another; and a first duct cover disposed so as to cover an opening of the pair of first ribs, and the second duct includes:

a pair of second ribs configured to protrude from the second cover surface and extend in a manner opposing one another; and a second duct cover disposed so as to cover an opening of the pair of second ribs.

4. The image forming apparatus according to claim 1, further comprising a connecting portion configured to connect the first duct and the second duct so as to guide air from one of the first duct or the second duct to the other of the first duct or the second duct.

5. The image forming apparatus according to claim 4, wherein the connecting portion is a fitting portion disposed on one of the first duct or the second duct and configured to fit to the other of the first duct or the second duct.

6. The image forming apparatus according to claim 4, wherein:

the connecting portion includes a relay duct fixed to the casing, a first end of the relay duct is connected to the first duct, and a second end of the relay duct is connected to the second duct.

7. The image forming apparatus according to claim 1, wherein:

the first inner cover is disposed in an openable and closable manner with respect to the casing by pivoting about a first pivot shaft arranged at a first end portion of the first inner cover, and the second inner cover is disposed in an openable and closable manner with respect to the casing by pivoting about a second pivot shaft arranged at an end portion, far from the first end portion, of the second inner cover.

8. The image forming apparatus according to claim 1, further comprising a reinforcing plate made of metal and fixed to the first inner cover and the second inner cover so as to be arranged across both the first inner cover and the second inner cover.

9. The image forming apparatus according to claim 1, further comprising:

a first reinforcing plate made of metal and fixed to the first inner cover; and a second reinforcing plate made of metal and fixed to the second inner cover.

10. The image forming apparatus according to claim 1, further comprising:

a first fixing portion configured to fix the first inner cover to the casing in a detachable manner; and a second fixing portion configured to fix the second inner cover to the casing in a detachable manner.

11. The image forming apparatus according to claim 1, wherein:

the image forming unit includes:

a photosensitive member;

a charging unit configured to charge the photosensitive member;

an exposing unit configured to expose the photosensitive member having been charged and form an electrostatic latent image on the photosensitive member; and a developing unit configured to develop the electrostatic latent image formed on the photosensitive member into a toner image using developer, and the first duct and the second duct are configured to guide air taken in from an exterior of the image forming apparatus to the charging unit.

12. The image forming apparatus according to claim 1, wherein:

the image forming unit includes:

a photosensitive member;

a charging unit configured to charge the photosensitive member;

an exposing unit configured to expose the photosensitive member having been charged and form an electrostatic latent image on the photosensitive member; and a developing unit configured to develop the electrostatic latent image formed on the photosensitive member into a toner image using developer, and the first duct and the second duct are configured to guide air taken in from an exterior of the image forming apparatus to the developing unit.

13. The image forming apparatus according to claim 1, wherein:

the image forming unit is a first image forming unit that is disposed on a side closest to a first end in a longitudinal direction of the image forming apparatus, the image forming apparatus further comprises a second image forming unit that is disposed on a side closest to a second end that is on an opposite side to the first end in the longitudinal direction, the second image forming unit being disposed in the casing and configured to form a toner image on a recording material, the first inner cover is arranged to face an inner side of the outer cover in the closed state and to face the first image forming unit, and the second inner cover is arranged to face the inner side of the outer cover in the closed state and to face the second image forming unit.

14. The image forming apparatus according to claim 1, wherein the outer cover constitutes a part of an exterior of the image forming apparatus.

15. The image forming apparatus according to claim 1, wherein the outer cover includes:

a first outer cover that is arranged to face the first inner cover and that is supported in an openable and closable manner on the casing; and a second outer cover that is arranged to face the second inner cover and that is supported in an openable and closable manner on the casing.

16. The image forming apparatus according to claim 1, wherein the second inner cover is disposed adjacent to the first inner cover in a direction orthogonal to a vertical direction.

17. The image forming apparatus according to claim 1, wherein the seal is:

fixed to the first duct, and apart from the second duct when the second inner cover is opened with respect to the casing.

18. The image forming apparatus according to claim 1, wherein the seal includes a sponge.

19. The image forming apparatus according to claim 1, further comprising:
- a first fan; and
- a second fan,
- wherein the first duct guides air taken in from outside the image forming apparatus by the first fan to the image forming unit, and
- wherein the second duct guides air taken in from outside the image forming apparatus by the second fan to the image forming unit.

20. An image forming apparatus comprising:
- a casing;
- an image forming unit disposed in the casing;
- an outer cover configured to be arranged in an open state and a closed state with respect to the casing;
- a first inner cover made of resin and arranged to face an inner side of the outer cover in the closed state, the first inner cover including a first duct; and
- a second inner cover made of resin and arranged to face the inner side of the outer cover in the closed state, the second inner cover including a second duct,
- wherein the outer cover includes:
  - a first outer cover that is arranged to face the first inner cover and that is supported in an openable and closable manner on the casing; and
  - a second outer cover that is arranged to face the second inner cover and that is supported in an openable and closable manner on the casing.

21. The image forming apparatus according to claim 20, wherein:
- the first inner cover includes a first cover surface that is disposed on an opposite side to a surface, facing the outer cover, of the first inner cover and that faces the image forming unit,
- the second inner cover includes a second cover surface that is disposed on an opposite side to a surface, facing the outer cover, of the second inner cover and that faces the image forming unit,
- the first duct is disposed on a side, on which the first cover surface is provided, of the first inner cover, and
- the second duct is disposed on a side, on which the second cover surface is provided, of the second inner cover.

22. The image forming apparatus according to claim 20, wherein:
- the first inner cover includes a first cover surface that is disposed on an opposite side to a surface, facing the outer cover, of the first inner cover and that faces the image forming unit,
- the second inner cover includes a second cover surface that is disposed on an opposite side to a surface, facing the outer cover, of the second inner cover and that faces the image forming unit,
- the first duct includes:
  - a pair of first ribs configured to protrude from the first cover surface and extend in a manner opposing one another; and
  - a first duct cover disposed so as to cover an opening of the pair of first ribs, and
- the second duct includes:
  - a pair of second ribs configured to protrude from the second cover surface and extend in a manner opposing one another; and
  - a second duct cover disposed so as to cover an opening of the pair of second ribs.

23. The image forming apparatus according to claim 20, further comprising a connecting portion configured to connect the first duct and the second duct so as to guide air from one of the first duct or the second duct to the other of the first duct or the second duct.

24. The image forming apparatus according to claim 23, wherein the connecting portion is a fitting portion disposed on one of the first duct or the second duct and configured to fit to the other of the first duct or the second duct.

25. The image forming apparatus according to claim 23, wherein:
- the connecting portion includes a relay duct fixed to the casing,
- a first end of the relay duct is connected to the first duct, and
- a second end of the relay duct is connected to the second duct.

26. The image forming apparatus according to claim 20, wherein:
- the first inner cover is disposed in an openable and closable manner with respect to the casing by pivoting about a first pivot shaft arranged at a first end portion of the first inner cover, and
- the second inner cover is disposed in an openable and closable manner with respect to the casing by pivoting about a second pivot shaft arranged at an end portion, far from the first end portion, of the second inner cover.

27. The image forming apparatus according to claim 20, further comprising a reinforcing plate made of metal and fixed to the first inner cover and the second inner cover so as to be arranged across both the first inner cover and the second inner cover.

28. The image forming apparatus according to claim 20, further comprising:
- a first reinforcing plate made of metal and fixed to the first inner cover; and
- a second reinforcing plate made of metal and fixed to the second inner cover.

29. The image forming apparatus according to claim 20, further comprising:
- a first fixing portion configured to fix the first inner cover to the casing in a detachable manner; and
- a second fixing portion configured to fix the second inner cover to the casing in a detachable manner.

30. The image forming apparatus according to claim 20, wherein:
- the image forming unit includes:
  - a photosensitive member;
  - a charging unit configured to charge the photosensitive member;
  - an exposing unit configured to expose the photosensitive member having been charged and form an electrostatic latent image on the photosensitive member; and
  - a developing unit configured to develop the electrostatic latent image formed on the photosensitive member into a toner image using developer, and
- the first duct and the second duct are configured to guide air taken in from an exterior of the image forming apparatus to the charging unit.

31. The image forming apparatus according to claim 20, wherein:
- the image forming unit includes:
  - a photosensitive member;
  - a charging unit configured to charge the photosensitive member;

an exposing unit configured to expose the photosensitive member having been charged and form an electrostatic latent image on the photosensitive member; and a developing unit configured to develop the electrostatic latent image formed on the photosensitive member into a toner image using developer, and the first duct and the second duct are configured to guide air taken in from an exterior of the image forming apparatus to the developing unit.

32. The image forming apparatus according to claim 20, wherein:

the image forming unit is a first image forming unit that is disposed on a side closest to a first end in a longitudinal direction of the image forming apparatus, the image forming apparatus further comprises a second image forming unit that is disposed on a side closest to a second end that is on an opposite side to the first end in the longitudinal direction, the second image forming unit being disposed in the casing and configured to form a toner image on a recording material, the first inner cover is arranged to face an inner side of the outer cover in the closed state and to face the first image forming unit, and the second inner cover is arranged to face the inner side of the outer cover in the closed state and to face the second image forming unit.

33. The image forming apparatus according to claim 20, wherein the outer cover constitutes a part of an exterior of the image forming apparatus.

34. The image forming apparatus according to claim 20, wherein the second inner cover is disposed adjacent to the first inner cover in a direction orthogonal to a vertical direction.

35. The image forming apparatus according to claim 20, further comprising:

a first fan; and a second fan, wherein the first duct guides air taken in from outside the image forming apparatus by the first fan to the image forming unit, and wherein the second duct guides air taken in from outside the image forming apparatus by the second fan to the image forming unit.

36. An image forming apparatus comprising:

a casing;

an image forming unit disposed in the casing;

an outer cover configured to be arranged in an open state and a closed state with respect to the casing;

a first inner cover made of resin and arranged to face an inner side of the outer cover in the closed state, the first inner cover including a first duct;

a second inner cover made of resin and arranged to face the inner side of the outer cover in the closed state, the second inner cover including a second duct; and a reinforcing plate made of metal and fixed to the first inner cover and the second inner cover so as to be arranged across both the first inner cover and the second inner cover.

37. An image forming apparatus comprising:

a casing;

an image forming unit disposed in the casing;

an outer cover configured to be arranged in an open state and a closed state with respect to the casing;

a first inner cover made of resin and arranged to face an inner side of the outer cover in the closed state, the first inner cover including a first duct;

a second inner cover made of resin and arranged to face the inner side of the outer cover in the closed state, the second inner cover including a second duct;

a first reinforcing plate made of metal and fixed to the first inner cover; and a second reinforcing plate made of metal and fixed to the second inner cover.

* * * * *